(12) United States Patent
Poling et al.

(10) Patent No.: US 11,295,087 B2
(45) Date of Patent: Apr. 5, 2022

(54) SHAPE LIBRARY SUGGESTIONS BASED ON DOCUMENT CONTENT

(71) Applicant: Apple Inc., Cupertino, CA (US)

(72) Inventors: Ryan John Poling, Los Gatos, CA (US); Eric M. Lombardo, Cranberry Township, PA (US); David A. Turner, Pittsburgh, PA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/444,902

(22) Filed: Jun. 18, 2019

(65) Prior Publication Data
US 2020/0302021 A1  Sep. 24, 2020

Related U.S. Application Data

(60) Provisional application No. 62/820,124, filed on Mar. 18, 2019.

(51) Int. Cl.
*G06F 16/28* (2019.01)
*G06F 40/30* (2020.01)
*G06F 9/451* (2018.01)
*G06F 3/0482* (2013.01)
*G06F 16/93* (2019.01)

(52) U.S. Cl.
CPC .......... *G06F 40/30* (2020.01); *G06F 3/0482* (2013.01); *G06F 9/451* (2018.02); *G06F 16/285* (2019.01); *G06F 16/93* (2019.01)

(58) Field of Classification Search
CPC ........ G06F 40/30; G06F 9/451; G06F 16/285; G06F 16/93; G06F 3/0482
See application file for complete search history.

(56) References Cited

U.S. PATENT DOCUMENTS

| | | | |
|---|---|---|---|
| 2013/0117268 A1* | 5/2013 | Smith | G06F 40/117 707/739 |
| 2015/0046779 A1 | 2/2015 | Akselrod et al. | |
| 2016/0196681 A1 | 7/2016 | Tilton | |
| 2016/0228772 A1* | 8/2016 | Horovitz | G06K 9/00 |
| 2017/0140250 A1* | 5/2017 | Maloney | G06T 11/60 |
| 2018/0285447 A1* | 10/2018 | Takemoto | G06F 16/335 |
| 2018/0300315 A1* | 10/2018 | Leal | G06F 16/36 |
| 2018/0365316 A1* | 12/2018 | Liang | G06F 16/954 |
| 2019/0243890 A1* | 8/2019 | Kwatra | G06F 40/274 |
| 2020/0134734 A1* | 4/2020 | Aneesh | G06N 3/08 |

* cited by examiner

*Primary Examiner* — Jennifer N Welch
*Assistant Examiner* — Amy P Hoang
(74) *Attorney, Agent, or Firm* — Fletcher Yoder PC

(57) ABSTRACT

Systems, methods, and devices are provided for determining shape objects to suggest for display on a graphical user interface (GUI). The method may include detecting an input to change one or more objects in an application, in which the object includes an image content, a text content, or both. The method may also include, providing the object to an image classifier, a text classifier, or both in response to detecting the input. Moreover, the method may include receiving a classification of the changed object in response to providing the object. The method may also include identifying suggested shapes for insertion into the application based on the classification. Further, the method may include receiving a request to insert shapes and presenting the suggested shape for insertion in the application.

24 Claims, 13 Drawing Sheets

US 11,295,087 B2

SHAPE LIBRARY SUGGESTIONS BASED ON DOCUMENT CONTENT

CROSS-REFERENCE TO RELATED APPLICATION

This application claims priority to and the benefit of U.S. Provisional Application No. 62/820,124, entitled "SHAPE LIBRARY SUGGESTIONS BASED ON DOCUMENT CONTENT," filed Mar. 18, 2019, which is herein incorporated by reference in its entirety.

BACKGROUND

The present disclosure relates generally to graphical user interfaces (GUIs) and, more particularly, to determining suggested content in a content library for display on the GUI.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Electronic devices, such as smartphones and laptops, often include a display that supports a graphical user interface (GUI). The GUI may enable a user to communicate with the electronic device by allowing the user to interact with graphical icons and visual indicators on the display. For example, a user may interact with a presentation application by applying objects from a library of objects, such as images, videos, texts, etc. on a slide of the presentation application. To facilitate or enhance the presentation, the user may also include related content that is related to the objects on the slide. Often, finding related content may involve the user browsing through the entire or a large portion of a content library of the presentation application. Unfortunately, as the amount of content available in a library increase, it may be increasingly difficult to find relevant content for use in the presentation, especially when there are a relatively large amount of content in the content library.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure generally relates to determining and presenting suggested content (e.g., shapes, video, images, audio, etc.) that may be relevant to a particular presentation by using machine learning to identify a classification of the document by analyzing contents of document. Suggested content is offered via a graphical user interface (GUI) based on the identified classification derived from the document content.

For example, application documents, such as a presentation application or word processing application document, may include a variety of objects that are inserted and placed by the user on a slide of the presentation application. For example, a slide may include text object(s), video object(s), audio objects, and/or image object(s), to name a few. To enhance the document or facilitate user interaction within the application, the application may include a content library that provides shapes, videos, audio, images, etc. that may be added to the document. When browsing the content library for content, the content may be categorized by one or more relatively broad categories. By way of example, the content library may display content based on a category for food, a category for animals, and a category for plants. When a relatively large number of content elements are included in the content library, the user may have difficulty sifting through and identifying a relevant content element within these categories in the content library.

To improve user identification and interaction with content provided by the content library, in some embodiments, upon the insertion of one or more objects (e.g., image and/or text) in an application document, a machine learning image classifier and text classifier may detect and analyze the contents of the objects and determine a classification of at least a portion of the document. Using this classification, related content suggestions are determined. In some embodiments, the classification may be identified by aggregating information from multiple objects in the document. In some cases, many different types of objects can be used determine the classification. Additionally, different levels of granularity in determining classification may be performed. For example, text and image objects on a single slide/page, multiple slides/pages, or entire document may be analyzed to determine the classification and ultimately provide content suggestions. Additionally or alternatively, in some embodiments, particular objects of the document may be given more weight when determining a relevant content to suggest. By way of example, a text object of a title slide may be weighed relatively heavier than text and/or image objects on other slides of the presentation to determine the relevant content to suggest. Further, in some embodiments, the results for determining a relevant content suggestion may also be used to prioritize existing categories of the content library.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

Figure 1:
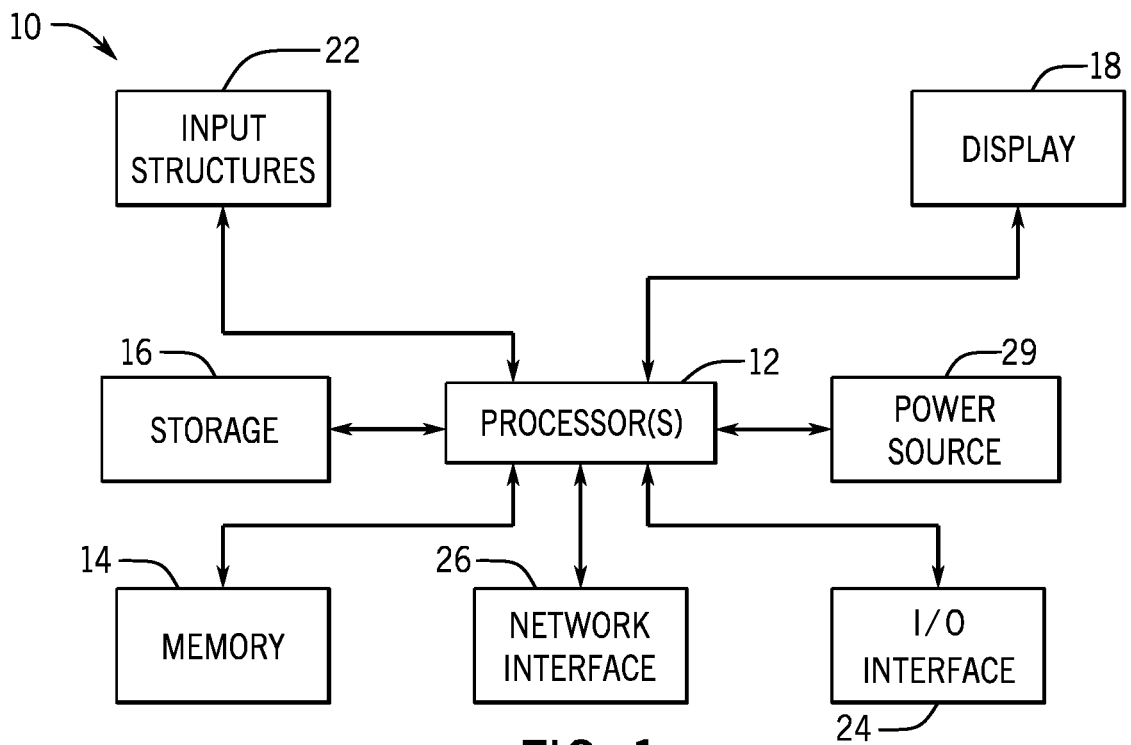
FIG. 1 is a block diagram of an electronic device that includes a graphical user interface, in accordance with an embodiment.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The below discussion focuses on shape library suggestions provided based upon the classification of a presentation application document. However, this is not intended to limit the scope of the current techniques to such embodiments. Indeed, as mentioned above, the current techniques may be used in a similar manner to identify many different types of content library suggestions, such as video, audio, and image content. Further, the current techniques may be implemented in a multitude of different application types. For example, the current techniques could be implemented in a word processing application, a spreadsheet application, or any other application where a document classification can be discerned to provide content library suggestions.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

The present disclosure generally relates to graphical user interfaces (GUIs) used to visually facilitate communication between a user and an electronic device. In particular, the user may interact with components of a shape library using the GUI. For example, in an iWork application, such as Keynote (e.g., a presentation application), the user may insert and place text objects, image objects, and/or shape objects on a slide of the presentation application.

To facilitate user interaction with the shape objects in the presentation application, a user may browse a shape library that provides an organized display of shape icons corresponding to respective shape objects. As an example, the organized display may include shapes provided by the presentation application package manufacturer. Further, the shapes may organized based on a commonality. For example, the shapes may categorized by a high level commonality including animals, plants, and food, and may be displayed according to their respective category.

However, when the shape library includes a relatively large number of shapes, the display of shapes in broad categories may not assist the user in easily and quickly identifying a specific shape that may be related to the user's presentation. In particular, when shapes are sorted at random or even organized by categories within the shape library, performing a textual search or a manual search for a specific shape by selecting and scrolling within the category, may be tedious and inefficient for the user, especially considering that the library will likely include quite a few shapes in a particular broad category and/or a large number of categories for relatively narrower category offerings. In other words, a search of the shape library within a particular category may result in multiple shapes assigned to the same broad category or may result in multiple categories with relatively fewer shapes in the case of relatively narrower categories. For example, in one embodiment, a user searching for a particular animal shape within the "animal" category of the shape library may receive a result of various shape results (e.g., dogs, cats, snakes, birds, etc.) within the animal category portion of the shape library.

Accordingly, the present disclosure provides systems and techniques to automatically suggest related shape(s) (or other content) for efficient selection and usage of shapes related to object(s) in the presentation. In some embodiments, a related shape suggestion may be made based on contents of objects in the presentation application. For example, in a presentation that includes images and text related to planets, a document classification of space may be determined and shapes including suns, stars, galaxies, and the like, may be automatically suggested to the user. In particular, an electronic device implementing the presentation application may detect an input of an object (e.g., image of a star) inserted into a slide of the presentation. The input may include copying and pasting the object, importing the object from an object library, and the like. Once the input is received, an indication of the inserted object may be provided to a machine learning image classifier and/or text classifier. The machine learning image classifier and/or text classifier may analyze the contents of the inserted object and determine a classification of the document/portion of the document and/or an appropriate shape to suggest in the shape library. The contents may be automatically analyzed when a change (e.g., input detection) occurs relating to the images or text in the presentation application or may be periodically analyzed (e.g., upon a particular function, such as save, import, export, etc. and/or at a particular performance interval of time).

Moreover, analysis of an image object may include using a machine learning image classifier. As described herein, the image classifier may be pre-trained using the shapes in the shape library and associated shape names or tagged shape labels. Additionally or alternatively, analysis of a text object may include using a topic extraction machine learning model to find topics relevant to the analyzed content of the text object. Based on the output of the machine learning image classifier and the topic extraction machine learning model, a search of the shape library may be performed. The search results (e.g., relevant shape(s) and/or categories of shapes) may be presented in a specially created "suggestion" category or categories that include the suggested relevant shapes, such as the sun, stars, galaxies, and the like mentioned in the above example.

Furthermore, analyzed image and text content may be aggregated to provide an accurate relevant shape suggestion. For example, aggregation may include using the content of multiple text and/or image objects of one or more slides of the presentation to derive an overarching classification of the entirety of a particular portion of the presentation. Additionally or alternatively, certain object types and/or objects in particular locations may likely provide a better clue as to the classification of the portion of the presentation or document. Thus, objects may be weighted based upon such factors, such that the content analyzed for the object is weighed heavily or lighter based on the associated weight. Further, in some embodiments, the search results may also be used to prioritize existing categories of the search library. For example, when the search results indicate that the contents are related to planets, then categories related to planets may appear at the top of the category list when the search library is selected.

With the foregoing in mind, a general description of a variety of suitable electronic devices may employ the techniques described herein to provide a freehand or straight line motion path that is applied to an object on a presentation slide. Turning first to FIG. 1, an electronic device 10 according to an embodiment of the present disclosure may include, among other things, one or more processor(s) 12, memory 14, nonvolatile storage 16, a display 18, input structures 22, an input/output (I/O) interface 24, a network interface 26, and a power source 29. The various functional blocks shown in FIG. 1 may include hardware elements (including circuitry), software elements (including computer code stored on a non-transitory computer-readable medium) or a combination of both hardware and software elements. It should be noted that FIG. 1 is merely one example of a particular implementation and is intended to illustrate the types of components that may be present in the electronic device 10.

Figure 2:
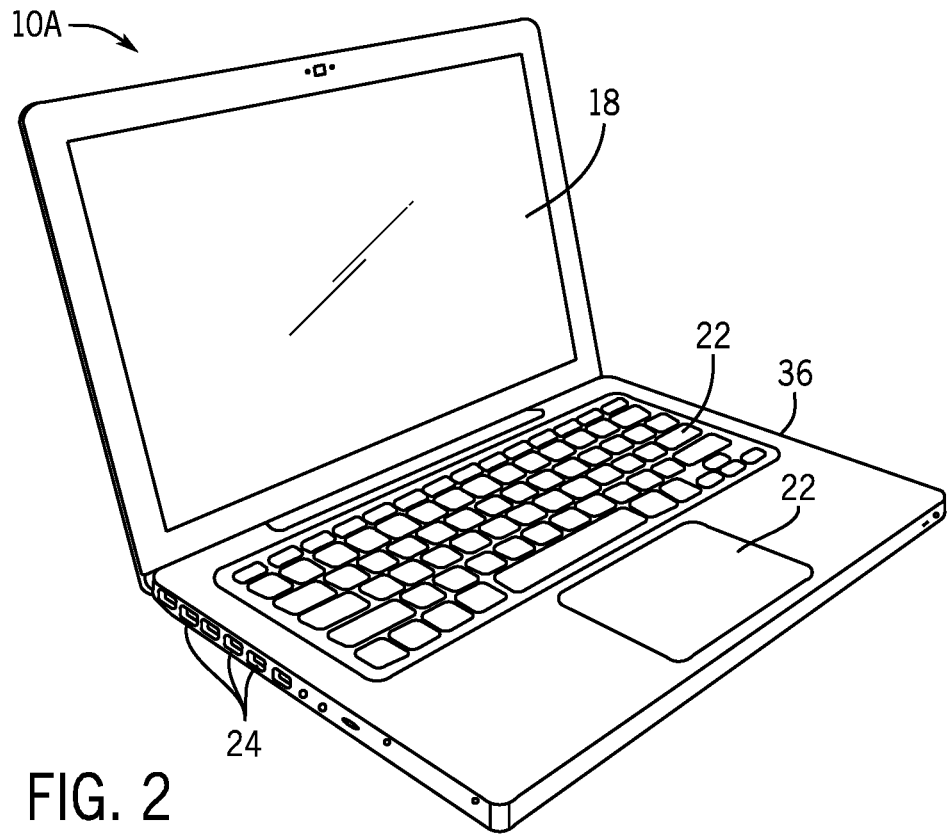
FIG. 2 is a perspective view of a notebook computer representing an embodiment of the electronic device of FIG. 1, in accordance with an embodiment of the present disclosure.
Figure 4:
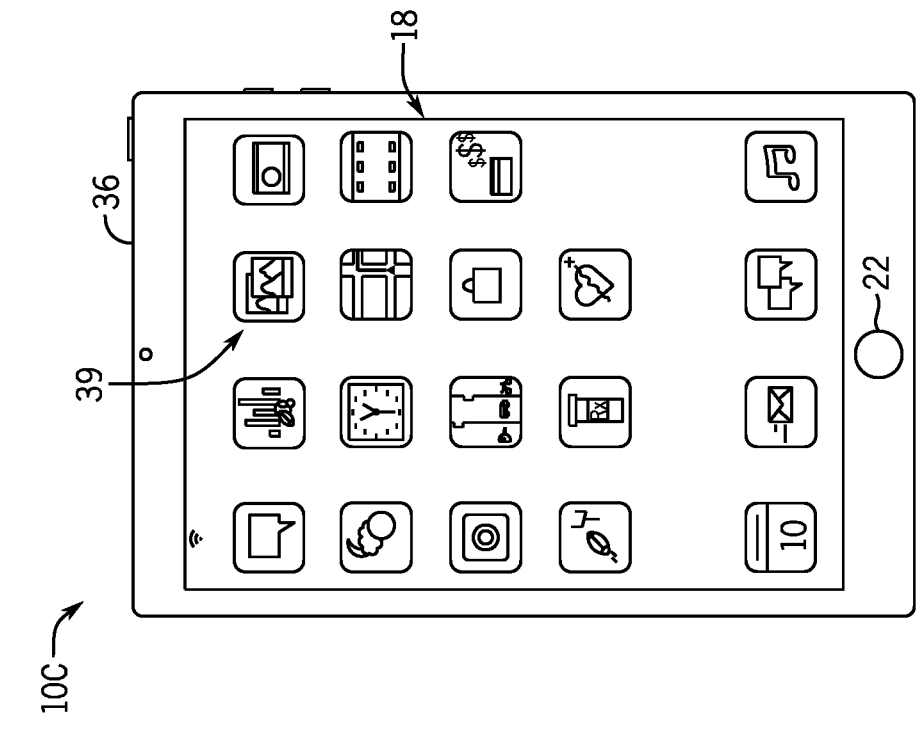
FIG. 4 is a front view of a hand-held tablet device representing another embodiment of the electronic device of FIG. 1 in accordance with an embodiment of the present disclosure.
Figure 3:
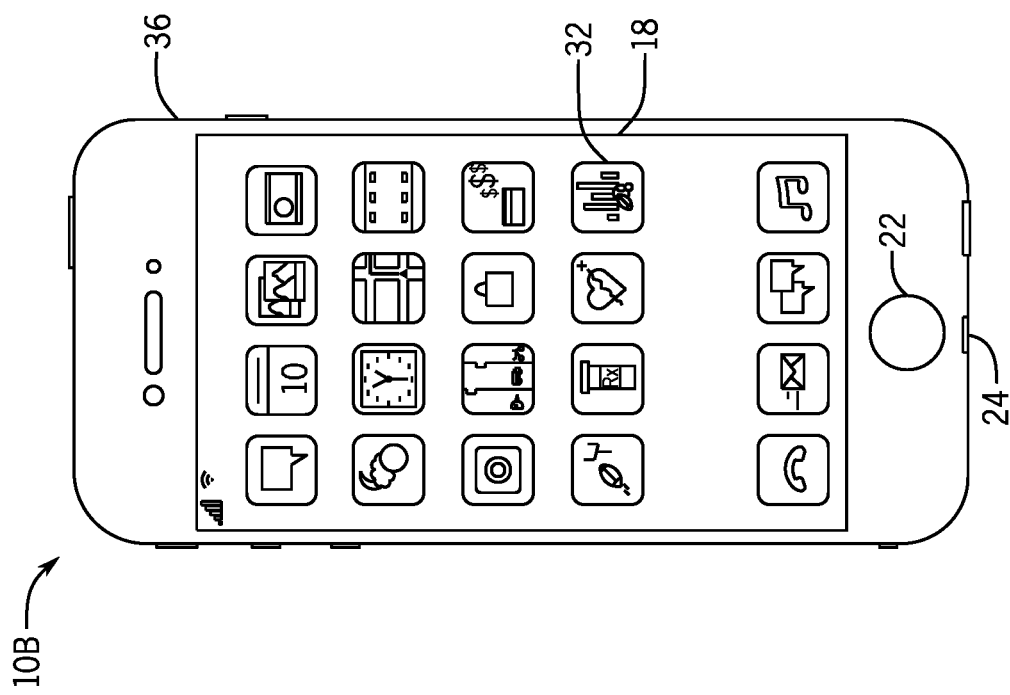
FIG. 3 is a front view of a handheld device representing another embodiment of the electronic device of FIG. 1, in accordance with an embodiment of the present disclosure.
Figure 5:
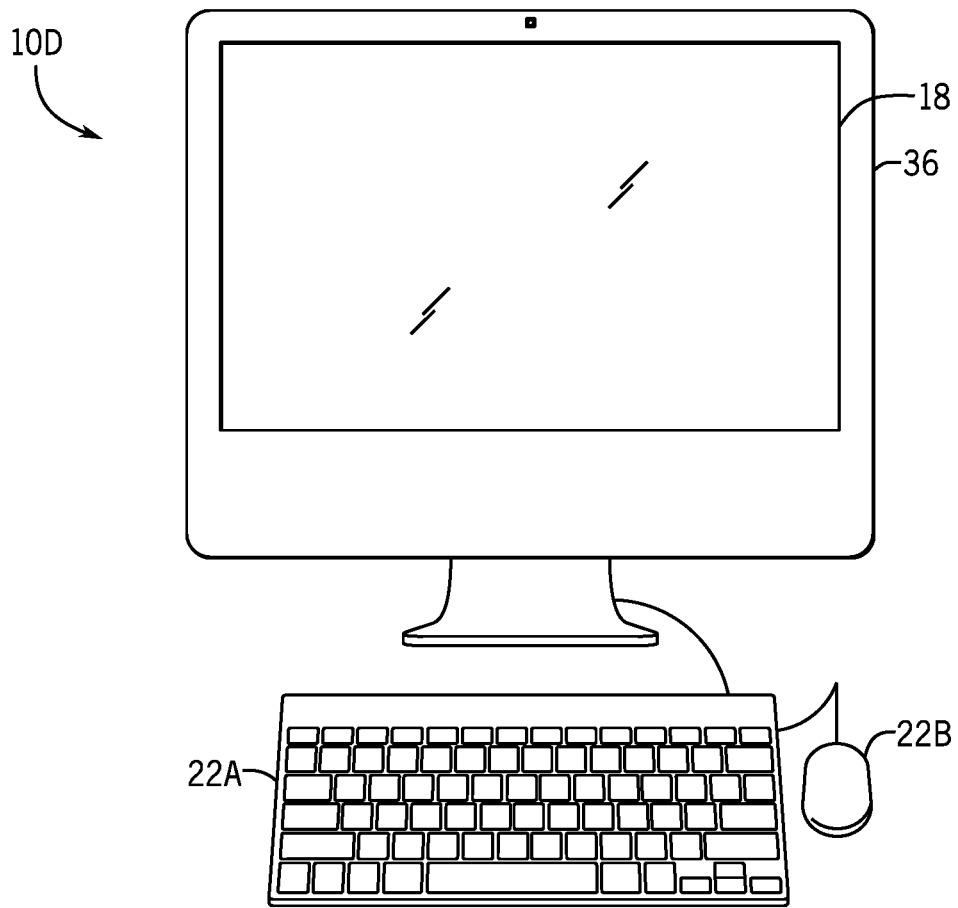
FIG. 5 is a front view of a desktop computer representing another embodiment of the electronic device of FIG. 1, in accordance with an embodiment of the present disclosure.
Figure 6:
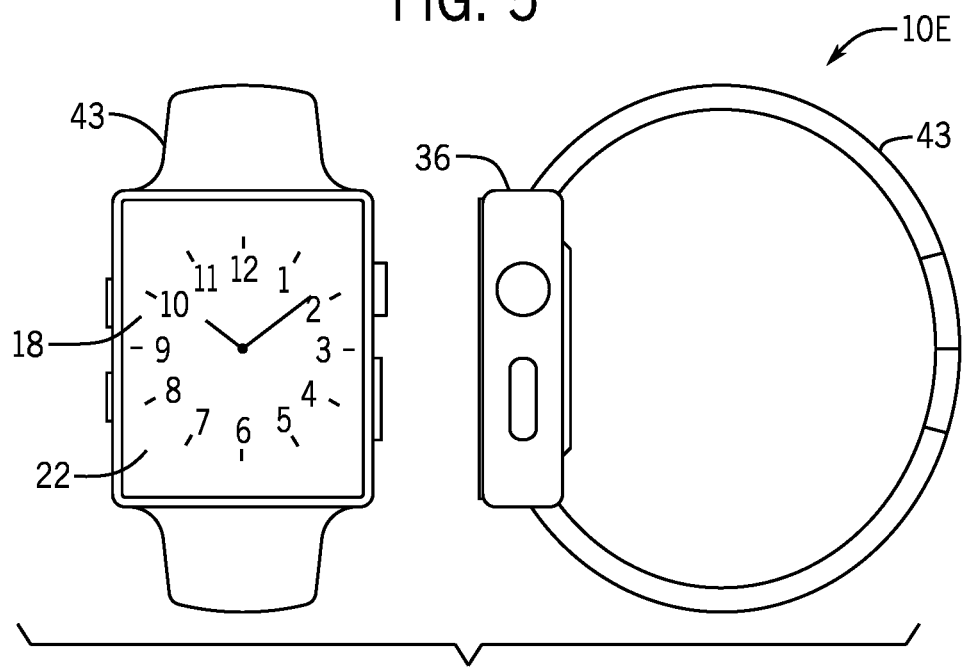
FIG. 6 is a front view and side view of a wearable electronic device representing another embodiment of the electronic device of FIG. 1, in accordance with an embodiment of the present disclosure.

By way of example, the electronic device 10 may represent a block diagram of the notebook computer depicted in FIG. 2, the handheld device depicted in FIG. 3, the handheld tablet device depicted in FIG. 4, the desktop computer depicted in FIG. 5, the wearable electronic device depicted in FIG. 6, or similar devices. It should be noted that the processor(s) 12 and other related items in FIG. 1 may be generally referred to herein as "data processing circuitry." Such data processing circuitry may be embodied wholly or in part as machine-readable instructions (e.g., software or firmware), hardware, or any combination thereof. Furthermore, the data processing circuitry may be separate components, components of a single contained processing module (e.g., a system-on-a-chip device), or may be incorporated wholly or partially within any of the other elements within the electronic device 10.

In the electronic device 10 of FIG. 1, the display 18 may be any suitable electronic display used to display image data (e.g., a liquid crystal display (LCD) or an organic light emitting diode (OLED) display). In some examples, the display 18 may represent one of the input structures 22, enabling users to interact with a user interface of the electronic device 10. In some embodiments, the electronic display 18 may be a MultiTouch™ display that may detect multiple touches at once, such as a finger and/or electronic pencil touching the display 18 to select a shape from the shape library of a displayed presentation application. Other input structures 22 of the electronic device 10 may include buttons, keyboards, mice, trackpads, and the like. The I/O interface 24 may enable electronic device 10 to interface with various other electronic devices, as may the network interface 26.

The network interface 26 may include, for example, one or more interfaces for a personal area network (PAN), such as a Bluetooth network, for a local area network (LAN), such as an 802.11x Wi-Fi network, and/or for a wide area network (WAN), such as a 4G or LTE cellular network. The network interface 26 may also include one or more interfaces for, for example, broadband fixed wireless access networks (WiMAX), mobile broadband Wireless networks (mobile WiMAX), asynchronous digital subscriber lines (e.g., ADSL, VDSL), digital video broadcasting-terrestrial (DVB-T) and its extension DVB Handheld (DVB-H), ultra-Wideband (UWB), alternating current (AC) power lines, and so forth.

The processor(s) 12 and/or other data processing circuitry may execute instructions and/or operate on data stored in the memory 14 and/or nonvolatile storage 16. In some embodiments, the processor(s) 12 of the electronic device 10 of FIG. 1 may be operably coupled with the memory 14 and the nonvolatile storage 16 to facilitate the use of the processors(s) 12 to implement various stored algorithms. As discussed herein, the algorithms may include algorithms enabling suggestion of a related shape in the shape library. Additional algorithms may include an algorithm to detect an object and determine the content of the object using an image classifier and/or text classifier to facilitate in providing the related shape suggestion.

Such programs or instructions executed by the processor(s) 12 may be stored in any suitable article of manufacture that includes one or more tangible, computer-readable media at least collectively storing the instructions or routines, such as the memory 14 and the nonvolatile storage 16. In another embodiment, the processor(s) 12 may receive an indication of a user drawing a motion path (e.g., by freehand or straight line), for example, by the input structures 22. The processor(s) 12 may generate the motion path to present the animation based upon this indication.

The memory 14 and the nonvolatile storage 16 may include any suitable articles of manufacture for storing data and executable instructions, such as random-access memory, read-only memory, rewritable flash memory, hard drives, and optical discs. In addition, programs (e.g., an operating system) encoded on such a computer program product may also include instructions that may be executed by the processor(s) 12 to enable the electronic device 10 to provide various functionalities. By way of example, a computer program product containing the instructions may include an operating system (e.g., OS X® or iOS by Apple Inc.) or an application program (e.g., Numbers®, Pages®, or Keynote® by Apple Inc.) or a suite of such application programs (e.g., iWork® by Apple Inc.).

As further illustrated, the electronic device 10 may include a power source 29. The power source 29 may include any suitable source of power, such as a rechargeable lithium polymer (Li-poly) battery and/or an alternating current (AC) power converter.

In certain embodiments, the electronic device 10 may take the form of a computer, a portable electronic device, a wearable electronic device, or other type of electronic device. Such computers may include computers that are generally portable (such as laptop, notebook, and tablet computers) as well as computers that are generally used in one place (such as conventional desktop computers, workstations, and/or servers). In certain embodiments, the electronic device 10 in the form of a computer may be a model of a MacBook®, MacBook® Pro, MacBook Air®, iMac®, Mac® mini, or Mac Pro® available from Apple Inc. By way of example, the electronic device 10, taking the form of a notebook computer 10A, is illustrated in FIG. 2. The depicted computer 10A may include a housing or enclosure 36, a display 18, input structures 22, and ports of an I/O interface 24. In one embodiment, the input structures 22 (such as a keyboard and/or touchpad and/or touch screen) may be used to interact with the computer 10A, such as to start, control, or operate a GUI or applications running on computer 10A. For example, a keyboard and/or touchpad may allow a user to navigate a user interface or application interface (e.g., presentation application) displayed on display 18. As previously mentioned, a user may interact with the applications displayed on the GUI, such as by a shape library to insert shapes into the slide of the presentation.

FIG. 3 depicts a front view of a handheld device 10B, which represents one embodiment of the electronic device 10. The handheld device 10B may represent, for example, a portable phone, a media player, a personal data organizer, a handheld game platform, or any combination of such devices. By way of example, the handheld device 10B may be a model of an iPod® or iPhone® available from Apple Inc. of Cupertino, Calif.

The handheld device 10B may include an enclosure 36 to protect interior components from physical damage and to shield them from electromagnetic interference. The enclosure 36 may surround the display 18, which may display a graphical user interface (GUI) having an array of icons 32. By way of example, one of the icons 32 may launch a spreadsheet application program (e.g., Keynote® by Apple Inc.). User input structures 22, in combination with the display 18, may allow a user to control the handheld device 10B. For example, the input structures 22 may activate or deactivate the handheld device 10B, navigate a user interface to a home screen, navigate a user interface to a user-configurable application screen, activate a voice-recognition feature, provide volume control, and toggle between vibrate and ring modes. Touchscreen features of the display 18 of the handheld device 10B may provide a simplified approach to controlling the presentation application program and/or selecting relevant shapes from the shape library of the presentation application. The handheld device 10B may include I/O interface 24 that opens through the enclosure 36. The I/O interface 24 may include, for example, an audio jack and/or a Lightning® port from Apple Inc. to connect to external devices, such as speakers and/or headphones.

FIG. 4 depicts a front view of a handheld tablet device 10C, which represents another embodiment of the electronic device 10. The handheld tablet device 10C may represent, for example, a tablet computer, or one of various portable computing devices. By way of example, the handheld tablet device 10C may be a tablet-sized embodiment of the electronic device 10, which may be, for example, a model of an iPad® available from Apple Inc. of Cupertino, Calif. The handheld tablet device 10C may also include an enclosure 36 that holds the electronic display 18. Input structures 22 may include, for example, a hardware or virtual home button.

Turning to FIG. 5, a computer 10D may represent another embodiment of the electronic device 10 of FIG. 1. The computer 10D may be any computer, such as a desktop computer, a server, or a notebook computer, but may also be a standalone media player or video gaming machine. By way of example, the computer 10D may be an iMac®, a MacBook®, or other similar device by Apple Inc. It should be noted that the computer 10D may also represent a personal computer (PC) by another manufacturer. A similar enclosure 36 may be provided to protect and enclose internal components of the computer 10D such as the display 18. In certain embodiments, a user of the computer 10D may interact with the computer 10D using various peripheral input devices, such as the keyboard 22A or mouse 22B (e.g., input structures 22), which may connect to the computer 10D. In one embodiment, the input structures 22 (e.g., a keyboard and/or touchpad and/or touchscreen) may be used to interact with the computer 10D, such as to start, control, or operate a GUI or applications (e.g., Keynote®, Pages®, or Numbers® by Apple Inc.) running on the computer 10D.

Similarly, FIG. 6 depicts a wearable electronic device 10E representing another embodiment of the electronic device 10 of FIG. 1 that may operate using the techniques described herein. By way of example, the wearable electronic device 10E, which may include a wristband 43, may be an Apple Watch® by Apple, Inc. More generally, the wearable electronic device 10E may be any wearable electronic device such as, for example, a wearable exercise monitoring device (e.g., pedometer, accelerometer, heart rate monitor), or other device by another manufacturer. The display 18 of the wearable electronic device 10E may include a touch screen display 18 (e.g., LCD, OLED display, active-matrix organic light emitting diode (AMOLED) display, and so forth), as well as input structures 22, which may allow users to interact with a user interface of the wearable electronic device 10E.

Electronic devices 10A, 10B, 10C, 10D, and 10E described above may each use a presentation or other document creation application with a shape library or other content library (e.g., image library, audio library, or video library) including shapes or other content that may be placed within the presentation or document. In some embodiments, a relevant shape may be displayed in a suggestion portion of the shape library graphical user interface (GUI) upon the selection of the library from the GUI. The relevant shape may be suggested based on the content of one or more existing and/or added objects (e.g., image and/or text) in the presentation (e.g., a slide of the presentation). While the following examples are provided in the context of a presentation application, the present approaches are suitable for use in other applications (e.g., word processing applications, spreadsheet applications, media storing or playback applications, and so forth) where objects may be displayed on the GUI.

Figure 7:
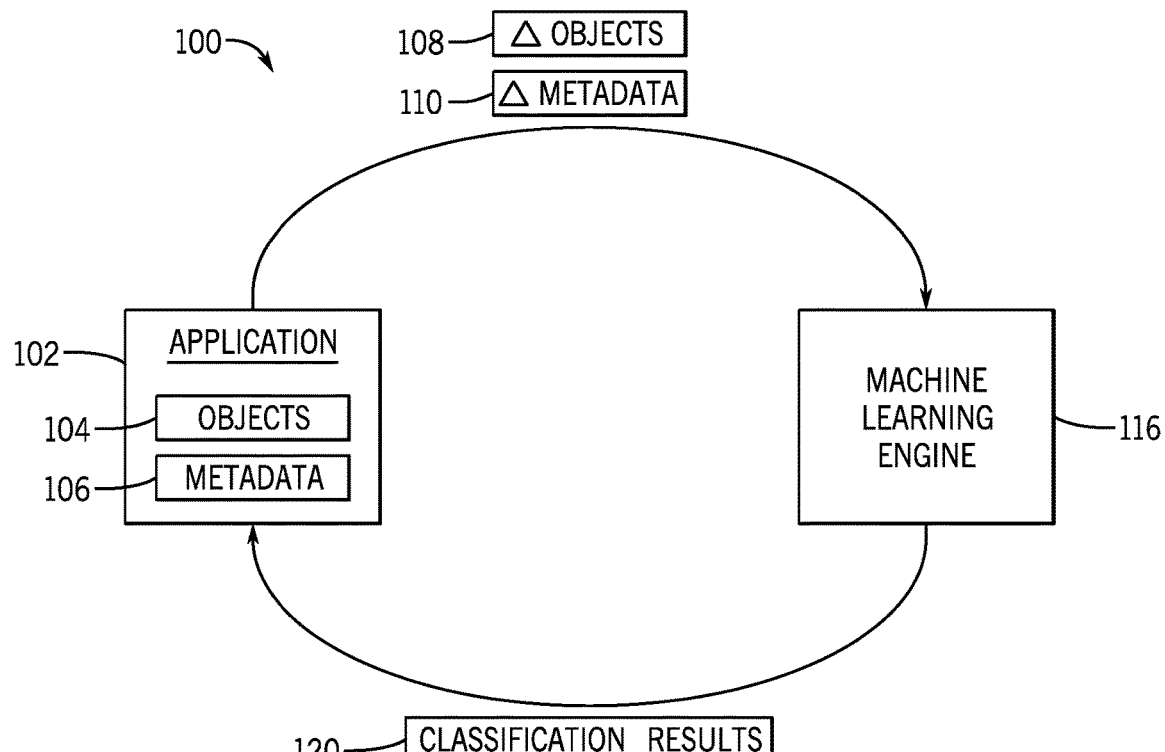
FIG. 7 is a flow diagram for determining a suggestion of relevant content for an identified document classification, in accordance with an embodiment.

To help illustrate determining relevant shapes, FIG. 7 depicts a flow diagram 100 of events to generate the suggested relevant shapes by using machine learning on a context of the presentation document. In particular, a presentation application 102 may include one or more objects 104, such as on a slide of the presentation of the presentation application. The object 104 may include an image, a text, and/or a shape. The image object 104 may include an inserted or copied image, such as a picture, a video, or clip art from a library of the presentation application 102. Moreover, the text object 104 may include a text box with at least one descriptive word, and the shape object 104 may include editable shapes from a shape library.

As previously mentioned, the shape library may include a large database of shapes (e.g., hundreds, thousands, etc.) and these shapes may be classified or categorized based on a commonality (e.g., food, animals, nature, etc.). Thus, the shape library may include a list of categories that may be selected, and upon the selection of a particular category, the shapes classified for the particular category may be displayed. In some embodiments, the shapes may be selected for editing, such that text may be added to the inside of the shape or the shape outline may be changed in color, thickness, etc.

Such objects 104 (e.g., images, texts, and/or shapes) may be associated with metadata 106. The metadata may include tagged labels or descriptive names that indicate the category or specification classification to which the particular object 104 belongs. The metadata may also include associated date and time stamp information. For example, two image objects 104 may depict the same image but each of the image objects 104 may be analyzed since the associated metadata may be different (e.g., different dates). As will be discussed in detail with reference to FIG. 15, the metadata 106 of a particular object 104 may be used to indicate a weight classification associated with the object 104. For example, the metadata 106 for a particular object 104, such as a text object 104 that is indicated as a title of the presentation, may indicate that the text object 104 should be weighted or considered more than other objects 104 of the presentation when determining relevant shapes to suggest.

Moreover, objects 104 and/or associated metadata 106 for the objects 104 on the slide may change, such as by adding additional objects 104, changing their weight, deleting the object 104, etc. Thus, if an object change 108 and/or associated metadata change 110 is detected, then changes may be analyzed by a machine learning engine 116.

As will be discussed in detail in FIG. 8, the machine learning engine 116 may analyze the contents of the object 104 and/or consider metadata 106 of object 104 to determine relevant shapes that may be relevant to the document objects. Briefly, the machine learning engine 116 may use an image classifier to determine the content of the object 104 when the object is an image (e.g., picture, video, etc.). Additionally or alternatively, the machine learning engine 116 may include a text classifier to determine the content of the object 104 when the object is a text box or includes text within an image object 104. The content data provided by the image classifier and/or text classifier may be used for classification results 120, which may include a classification for the object 104 or a set of objects 104. The classification result 120 may indicate the relevant shapes to suggest in the shape library. For example, if the object 104 or the group of objects 104 on the slide are related to cats, the objects 104 may be classified as "cat" (rather than a broad category of "animals"). Thus, the machine learning engine 116 may update its suggested shape determinations with each object change 108 and/or metadata change 110 or upon a threshold number of object changes 108 and/or metadata changes 110. In this manner, the machine learning engine may be used to accurately predict and provide relevant shapes with each change to the presentation or may reduce a number of transmission to the machine learning engine 116 by only providing changes upon a threshold amount of change. When a threshold is used, the threshold can be defined as a static number of changes, a ratio of objects to object changes, etc. Moreover, in some embodiments, and as discussed in detail in FIG. 15, the content and classification for multiple objects may be aggregated to determine shape suggestions.

Figure 8:
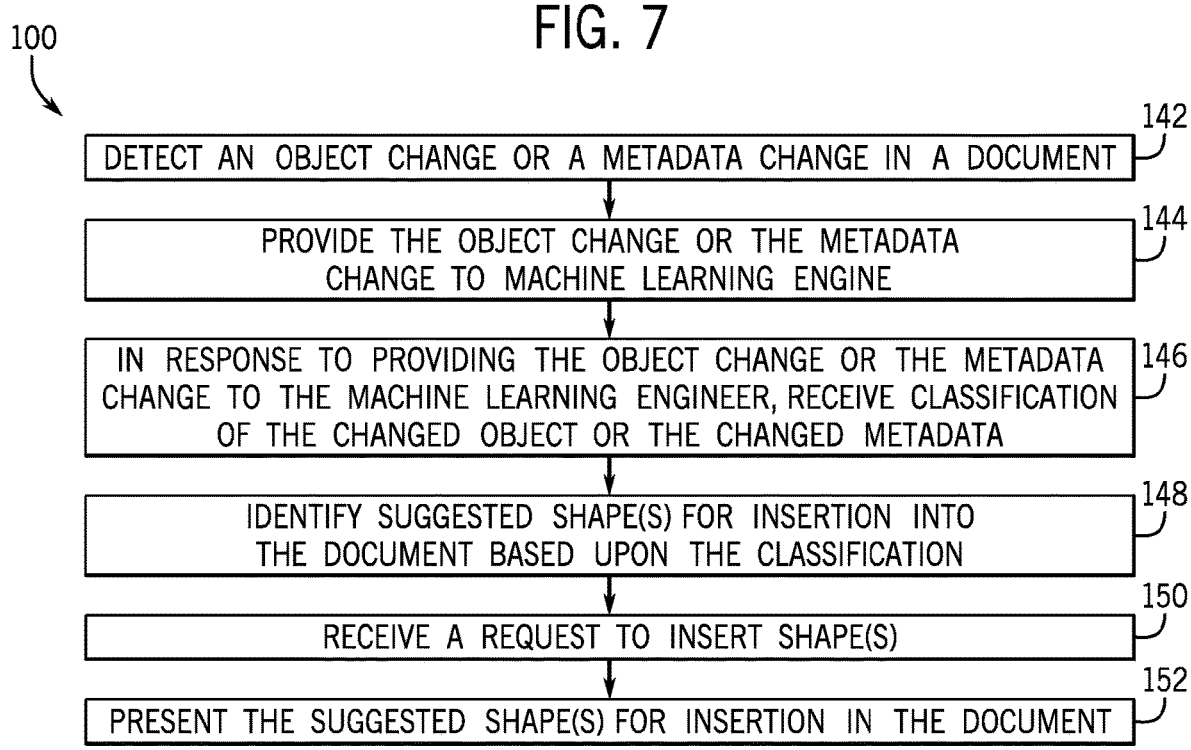
FIG. 8 is a process for determining the relevant content to suggest using machine learning, in accordance with an embodiment.

Now turning to a detailed discussion of determining relevant shapes, FIG. 8 depicts a process 140 for suggesting relevant shapes in the shape library on the presentation application 102 using machine learning. While the process 140 is described according to a certain sequence, it should be understood that the present disclosure contemplates that the described steps may be performed in different sequences than the sequence illustrated, and certain described steps may be skipped or not performed altogether. In some embodiments, the process 140 may be implemented at least in part by executing instructions stored in a tangible, non-transitory, computer-readable medium, such as the memory 14, using processing circuitry, such as the processor 12. Additionally or alternatively, the process 140 may be implemented at least in part by circuit connections and/or control logic implemented in an electronic device 10.

In particular, the presentation application 102 may include a shape library that includes various shapes and the shapes may be organized by categories, as previously discussed. The process 140 may include a detection (block 142) of an object change 108 and/or a metadata change 110 on a slide of the presentation. In some embodiments, the presentation may include multiple slides and each object 104 (e.g., on each slide) and its associated metadata 106 (e.g., time stamp, name, tagged label, weight properties, etc.) may be considered when determining relevant shapes to suggest. By way of example, an object change 108 may include inserting, deleting, and/or objects 104 and a metadata change 110 may include a change to the metadata of a particular object 104.

After a change has been detected, the process 140 may include providing (block 144) an indication of the object change 108 and/or the metadata change 110 to the machine learning engine 116. Moreover, although the change may be provided as soon as the object change 108 or metadata 110 change has been detected, often a user may add multiple objects 104 before selecting the shape library, and thus, each change occurring since a previous transmission for selection of the shape library may be provided to the machine learning engine 116. Thus, the machine learning engine 116 may be provided changes occurring throughout different slides of the presentation.

In response to providing the object change 108 and/or metadata change 110 to the machine learning engine 116, the process 140 may include receiving (block 146) classification of the changed object 104 and/or the changed metadata 106. For example, the detected change may be considered to determine a specific content classification for the object 104 associated with the object change 108 or metadata change 110. In particular, the machine learning engine 116 may include an image classifier and/or a text classifier to classify the object 104 associated with the change.

The image classifier may determine the appropriate or relevant classification term or actual content to suggest for the object 104 based on the image contents of the object 104. The image classifier may be built into the operating system of the electronic device 10 or may be remote to the electronic device 10, residing as a cloud service. In some embodiments, the image classifier may applied to the object 104 as soon as the object 104 is changed (e.g., added, removed, etc.) from the slide or once a group of objects 104 have been changed (e.g., aggregated classification) in one or more slides of the presentation application 102.

The image classifier may determine an appropriate classification (e.g., shape classification) for the object 104 based on the image contents of the object 104. By way of example, the image classifier may determine that the object 104 includes a palm tree and thus, may output shapes associated with the shape classification of tree and/or palm tree. To facilitate determining and outputting the relevant shapes associated with the particular shape classification for the object 104, the image classifier may include a database of folders, each labeled with unique shape classification label (s) or tagged with shape classification labels for a particular image. The folders may include multiple images that a user may associate with a particular shape classification. The image classifier may determine whether the shape classification in the folder matches the image contents of the object 104 with high enough accuracy (e.g., confidence). For example, the image classifier may determine an 80% confidence level for the "tree" shape classification and a 30% confidence level for the "palm tree" shape classification. The image classifier may select, as the output, the shapes in the shape classification folder that has the highest confidence level when multiple shape classifications have been determined and/or may select the shape classification whose confidence level is greater than or equal to a predetermined confidence threshold. As such, the image classifier may provide shape classifications for each object 104 of greater accuracy and granularity.

For other types of image objects 104, such as videos, the image classifier may perform an image classification on one or more frames of the video to determine a classification label that appropriately describes the contents of the video. As an example, when a first frame of the video includes a waterfall and a second frame of the video includes a cliff, the image classifier may output a shape classification of "landscape."

Similarly, the text classifier for text objects 104 may extract and use keywords from the text to determine classification(s) that best describes the subject of the text. In some embodiments, the text classifier may use bolded or italicized words as keywords in the text object 104 that should be weighted more heavily than other words in the text. Regardless of the object type, the image classifier may determine a confidence for each generated classification and may output the appropriate shape classification for the object 104.

In some embodiments, once the shape classification is generated for the object(s) 104, the metadata (e.g., tagged labels) of the object 104 may be updated to reflect the shape classification. In particular, the shape classification for an image or text object 104 may be stored in the presentation application and the shape classification. For example, the image or text classifier may output the shape classification label "tree" as a the most appropriate classification tag for the object 104 and this tag may be stored locally for the image on the presentation application. Thus, reanalysis may be unnecessary for the same image object 104 if it is used again in the presentation.

As will be discussed in detail in FIGS. 15-18, in addition to the one or more object changes 108 or metadata changes 110, the weight properties of an object 104 may be changed and detected upon the change. For example, the title (e.g., text object 104) of the presentation may be indicative of the types of objects 104 likely to be used in the presentation, and thus, the text of the presentation title may be given more weight when determining a classification the object change 108 or metadata change 110. Furthermore, both text and images may be used to precisely determine relevant shapes to suggest, and thus multiple object changes 108 and/or metadata changes 110 may be aggregated when determining classification. For example, determining an aggregated classification may include combining multiple object changes 108 and/or metadata changes 110 on the active slide, multiple slides of the presentation, or the presentation as a whole.

Next, the process 140 may include identifying (block 148) suggested shape(s) for insertion into the slide based upon the classification. In particular, after determining the shape classification with the highest confidence level and/or above a predetermined confidence threshold, the classification may be used to provide corresponding relevant shapes from the shape library. Continuing with the example of an image of a palm tree, the classification label shape classification of "tree" or "palm tree" may be used to identify shapes associated with or tagged with such shape classification labels in the shape library. For example, the shapes in the shape library that may be organized by categories, may include metadata of tagged labels, such that each shape is tagged with one or more specific shape classification labels. As such, these labels may be used to easily identify the suggested shapes. In other embodiments, suggested content may include a video from a video library, audio from an audio library, and/or an image from an image library.

Once the one or more suggested shapes have been identified, the process 140 may include receiving (block 150) a request to insert the shape(s). For example, after the user adds a new image object 104 to the slide, the user may enhance the slide by adding a shape. To add a shape, the user may select an option to add a shape from the shape library from a graphical user interface (GUI).

Rather than requiring the user to scroll through the entire library or general categories to find a relevant shape, the process 140 may include presenting (block 152) the suggested shape(s) for insertion into the document (e.g., slide) in a suggestions section of the GUI. Thus, the user may efficiently identify a relevant shape to use in the presentation slide.

Figure 9:
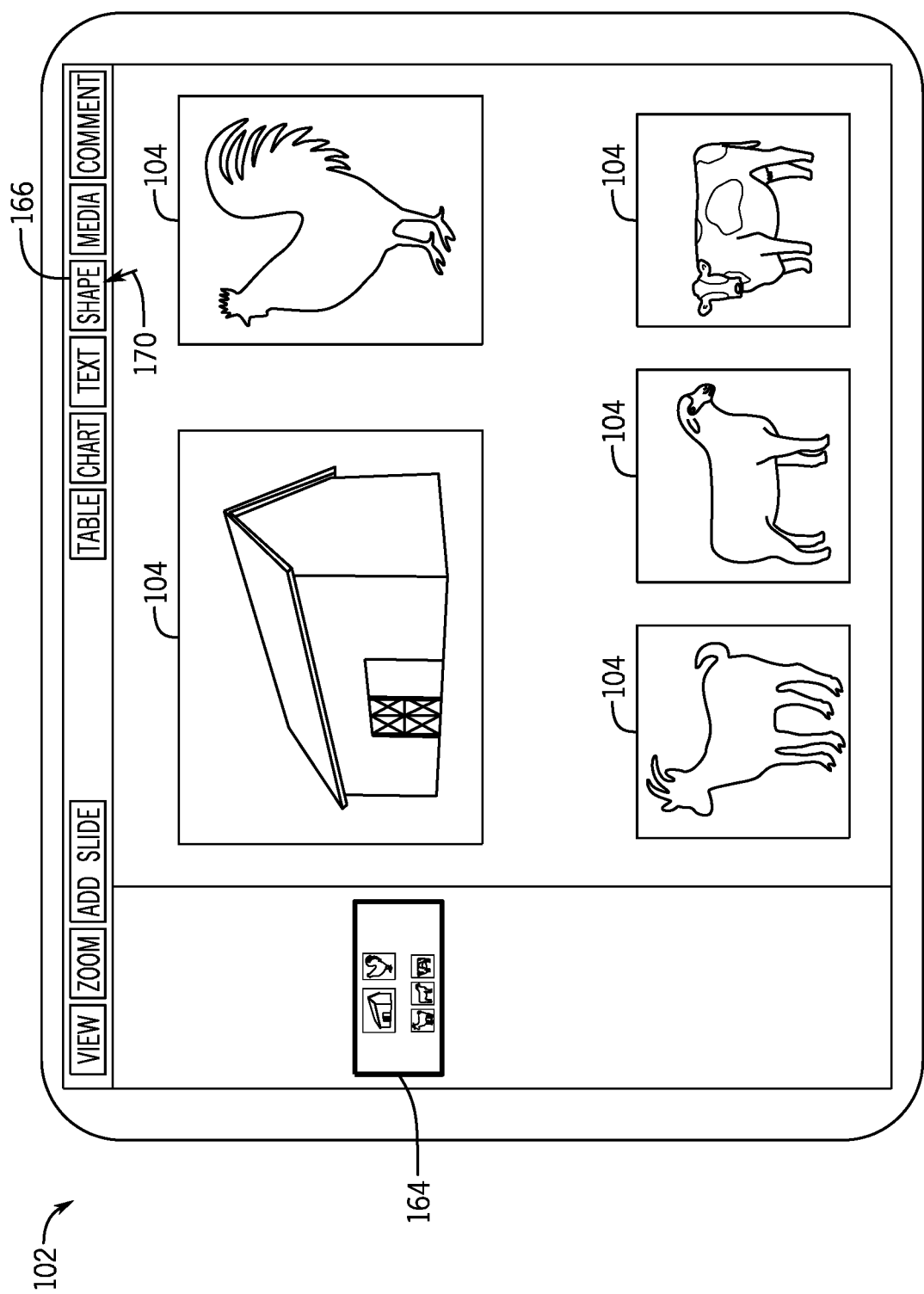
FIG. 9 is a schematic of a slide of a presentation application having image objects on the slide, in accordance with an embodiment.

To illustrate, FIG. 9 depicts a presentation application 102 having image objects 104 on a slide of the presentation. The presentation application 102 may include a single slide or multiple slides to be played in sequence for a presentation. In the depicted embodiment, the presentation application 102 includes a single slide 164. Moreover, the presentation application 102 may include an organization interface, such as buttons, menus, drop down boxes, and so forth, which may allow a user to interact and invoke various functions within the presentation application. For example, and as shown, a shape button 166 may be interacted with to access a shape library and insert a shape. As mentioned above, certain shapes may be suggested based upon objects 104 of the slide 164.

In some instances, the user may select the slide 164 for modification, as shown by the bolded indication. For example, the user may insert an image, a shape, and/or a text object 104 onto the slide 164. Here, the user inserts multiple image objects 104 related to farm animals, such as a barn, a rooster, a goat, a lamb, and a cow. To modify the slide 164, the user may select 170 the shape button 166 to insert a shape object 104 onto the slide 160. The shape button 166 may display shapes from the shape library and provide shape suggestions using the techniques described above (e.g., machine learning using an image classifier and/or a text classifier).

Figure 10:
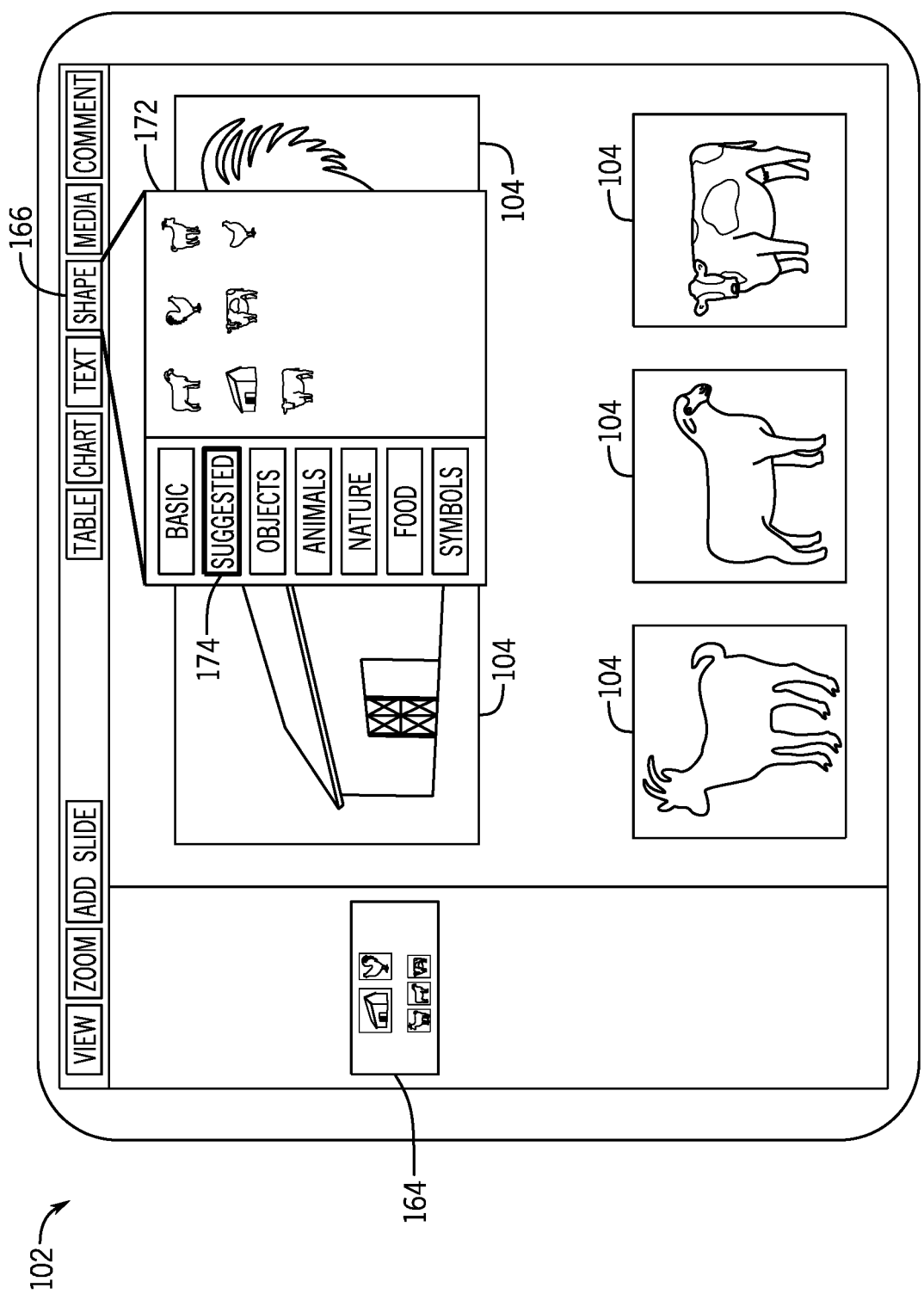
FIG. 10 is a schematic of the slide of the presentation application with suggested shapes from the shape library based on image objects of FIG. 9, in accordance with an embodiment.

Upon the selection of the shape button 166, a shape library 172 GUI may be displayed with suggested shapes based on the classification identified by the objects 104, as depicted in FIG. 10. As shown, the shape library 172 GUI may include a dialogue box with a list of selectable categories to view the shapes organized by category. For example, the shapes may be organized by basic, suggested, objects, animals, nature, food, and symbols categories. In the current implementation, the default selection is the suggested category 174, as shown by the bolded indication. Thus, the shape library 172 GUI may display suggested shapes by default upon rendering. Here, the shapes suggested by the suggested category 174 may relate to a barn yard since the objects 104 relate to barn yard, as may be determined by the image classifier. As mentioned herein, suggestions may be based upon individual objects in the relevant portions of a document and/or may be based upon an accumulation of objects within the relevant portion of the screen. Here, if the barn image is not an animal, so an accumulated classification would have to be something other than animal. Thus, barn yard appears to be a good selection, as each of these objects would likely appear in a barn yard.

Figure 11:
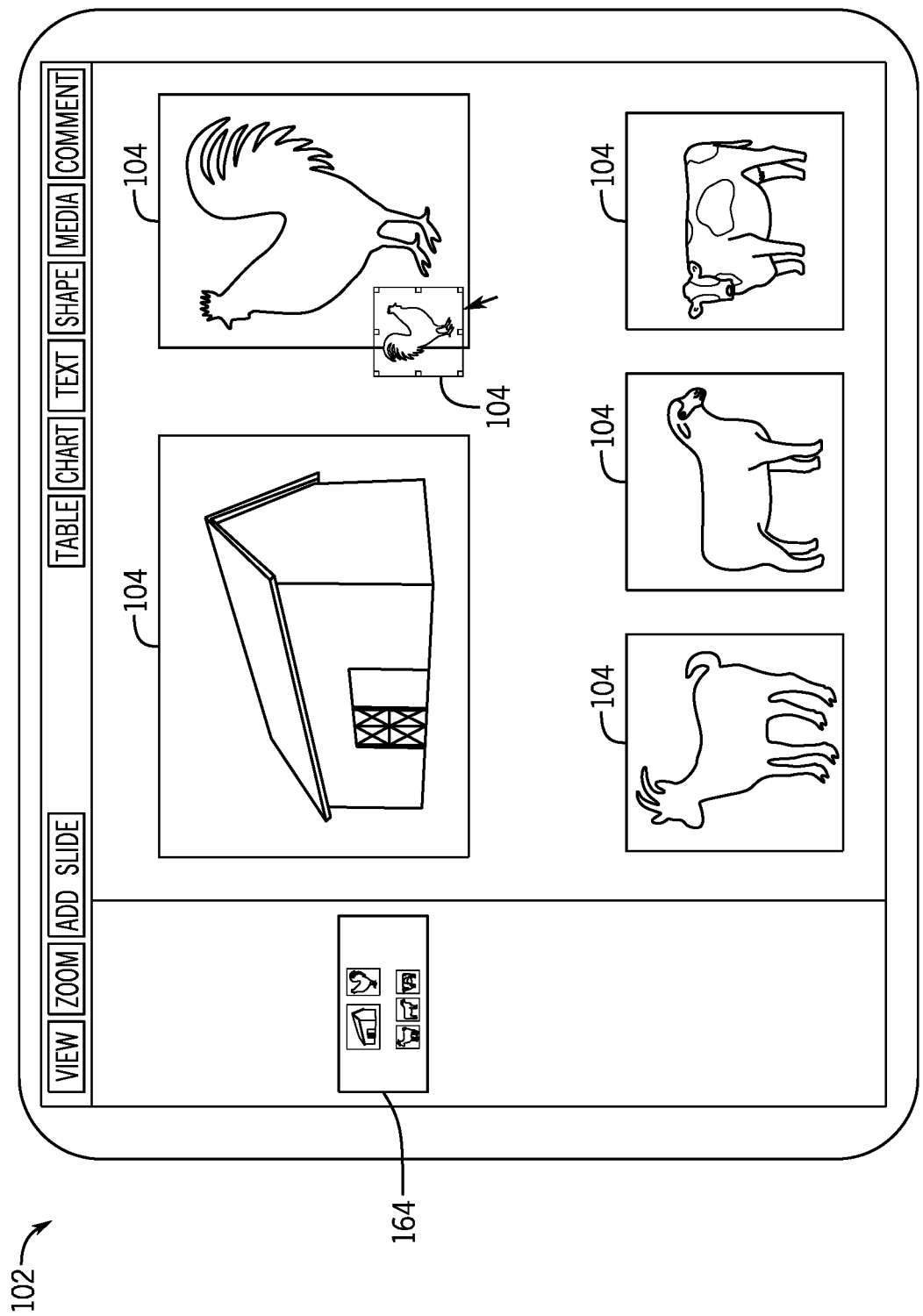
FIG. 11 is a schematic of the slide of the presentation application with a user inserting a suggested shape based on the image object of FIG. 10, in accordance with an embodiment.

As shown in FIG. 11, the user may insert a selected shape object 104 from the suggested category 174 of the shape library 172, as shown by the active or selected box border. In the depicted example, the selected shape object 104 depicts a rooster, which relates to the image objects 104 of FIG. 10. Thus, the user may easily identify a suggested shape that is relevant to the information presented on the slide 164 using the suggested category 174 rather than performing textual searches for the shape and/or manually selecting and scrolling through the different categories of the shape library 172.

Figure 12:
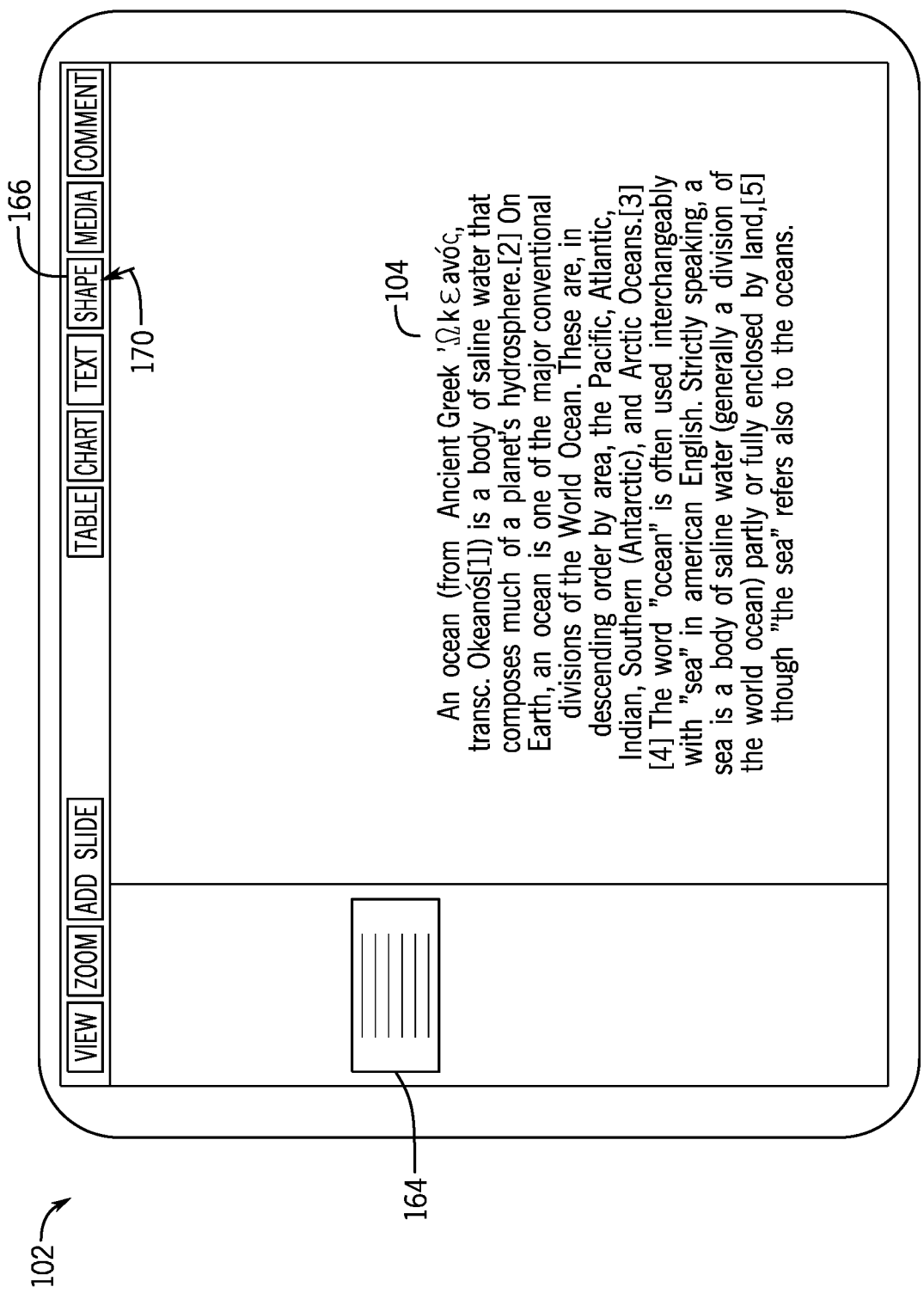
FIG. 12 is a schematic of a slide of a presentation application having text objects on the slide, in accordance with an embodiment.

In some embodiments, the present application 102 may include text objects 104, and thus, shapes may be suggested based on extracted text. To illustrate, FIG. 12 depicts the slide 164 with a text object 104. For example, the text of the text object 104 describes an ocean and examples of oceans. A user may select the slide 164 for modification, such as to insert an image, a shape, and/or a text object 104 onto the slide 164. In the current implementation, the user may select 170 the shape button 166 to insert a shape object 104 onto the slide 160. As previously discussed, the shape button 166 may display shapes from the shape library and provide shape suggestions, such as by machine learning using the text classifier.

Figure 13:
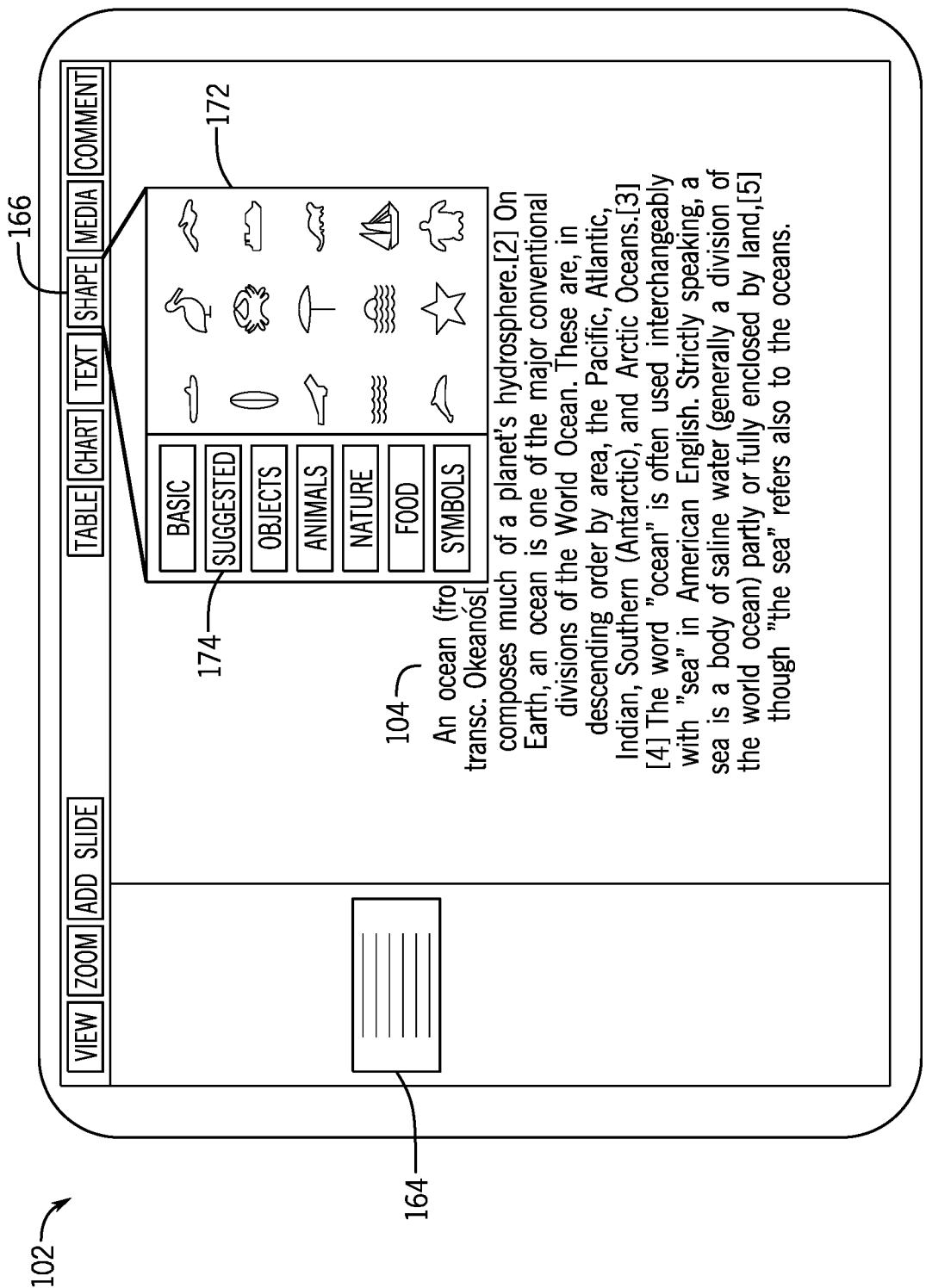
FIG. 13 is a schematic of the slide of the presentation application with suggested shapes from the shape library based on text objects of FIG. 12, in accordance with an embodiment.

Upon the selection of the shape button 166, the shape library 172 may display suggested shapes based on the text object 104, as depicted in FIG. 13. As shown, the shape library 172 may include a dialogue box with the list of selectable categories (e.g., basic, suggested, objects, animals, nature, food, and symbols) to view shapes included within the particular category. In the current implementation, the user selects the suggested category 174, as shown by the bolded indication. Upon selection, the shape library 172 may display suggested shapes. Here, the shapes suggested by the suggested category 174 may relate to the ocean since the text object 104 relates to the ocean, as may be determined by extracting key words using the text classifier.

Figure 14:
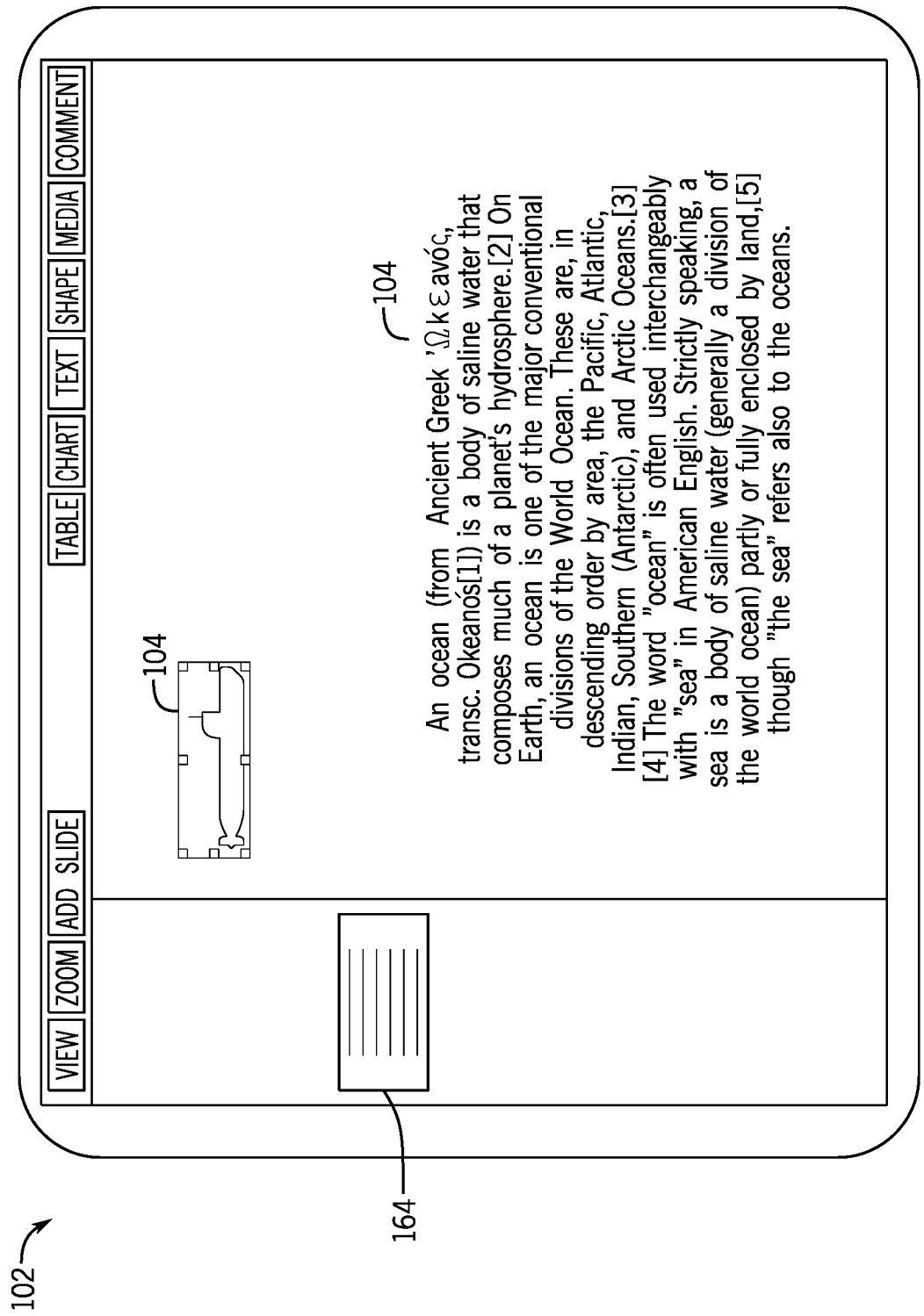
FIG. 14 is a schematic of the slide of the presentation application with a user inserting the suggested shape of FIG. 13, in accordance with an embodiment.

FIG. 14 depicts the user inserting a shape object 104 from the suggested category 174 of the shape library 172, as shown by the active or selected text box. The shape object 104 depicts a submarine, which relates to the text object 104 of FIG. 13 that describes an ocean. Thus, the user may easily identify a suggested shape that is relevant to the information presented on the slide 164 using the suggested category 174 rather than performing textual searches for the shape and/or manually selecting and scrolling through the different categories of the shape library 172.

Figure 15:
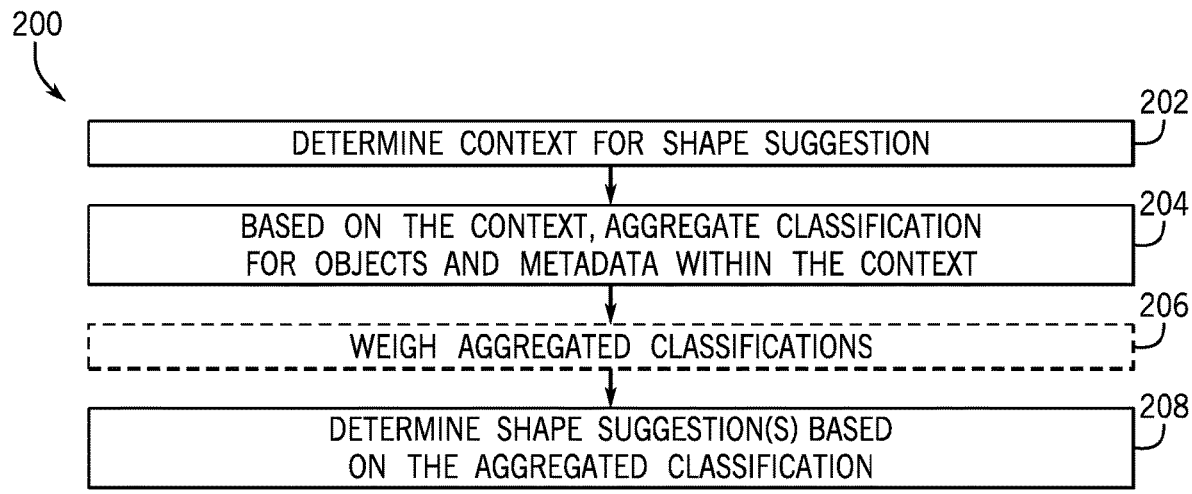
FIG. 15 is a process for suggesting a shape based on aggregated object classification using context, in accordance with an embodiment.

In some embodiments, the user may change multiple objects 104 on the slide 164. For example, the user may add one or more text objects 104 and one or more image objects 104. Moreover, the user may make similar changes to other slides in the presentation. Accordingly, in some embodiments, machine learning techniques described herein may be used to analyze contents of the images and text objects 104 within a portion (e.g., one slide or a few slides) or the entire presentation application (e.g., each slide). As shown in FIG. 15, a process 200 for suggesting shapes based on aggregated object classification may be used to provide relevant shape suggestions for objects 104 on one or more slides of the presentation application. While process 200 is described according to a certain sequence, it should be understood that the present disclosure contemplates that the described steps may be performed in different sequences than the sequence illustrated, and certain described steps may be skipped or not performed altogether. In some embodiments, the process 200 may be implemented at least in part by executing instructions stored in a tangible, non-transitory, computer-readable medium, such as the memory 14, using processing circuitry, such as the processor 12. Additionally or alternatively, the process 200 may be implemented at least in part by circuit connections and/or control logic implemented in an electronic device 10.

The process 200 may include determining (block 202) context for shape suggestion, such as to analyze objects 104 for shape suggestion in the context of a portion of a document, multiple portions of the document, or an entire document. Thus, suggestions may change based upon the varying context selection as predetermined by the document application (e.g., presentation application or word document application) or set by a user. Based on the context, such as whether to analyze image objects 104 and/or text objects 104 in the context of a slide or the entire presentation, the process 200 may include aggregating (block 204) classification and metadata 106 within the context. For example, when the entire presentation is set as the context for analysis, multiple classifications for image and text objects 104 may be aggregated, which may allow suggesting a more precise relevant shape for the user since additional context (e.g., classification for objects 104 throughout the entire presentation) is considered. Moreover, the aggregated metadata 106 may indicate tagged shape classification labels and/or changed properties associated with the objects 104. For example, in some embodiments, weight properties may be optionally modified for a particular object 104.

As mentioned above, the weight for particular objects 104 may be considered relatively more or less important than other objects 104 in determining the contextual classification. Accordingly, each of the objects 104 may be optionally weighed accordingly prior to determining shape suggestions (as indicated by the dashed box) (block 206). In this manner, shapes may be suggested according to both the context of particular objects 104 along with their weights.

Further, the process 200 may include determining (block 208) shape suggestion(s) based on the aggregated classification (e.g., combined image or text content and/or their associated weights) in the context, for example, the entire presentation. Thus, the shape suggestions in the shape library 172 may update based on aggregated classifications and/or weight of classifications. For example, the machine learning may determine shape suggestions based on the changed object 104 on an active slide 164 while also considering any changed objects 104 on the title slide of the presentation, which may be weighed more heavily since it likely includes the most relevant key words or images for the topic of the presentation. In some embodiments, a word document or spreadsheet may be analyzed in addition or alternative to the presentation application. In a spreadsheet application, the application may include a spreadsheet application document with a portion that includes a sheet, a row, and/or a column.

Figure 16:
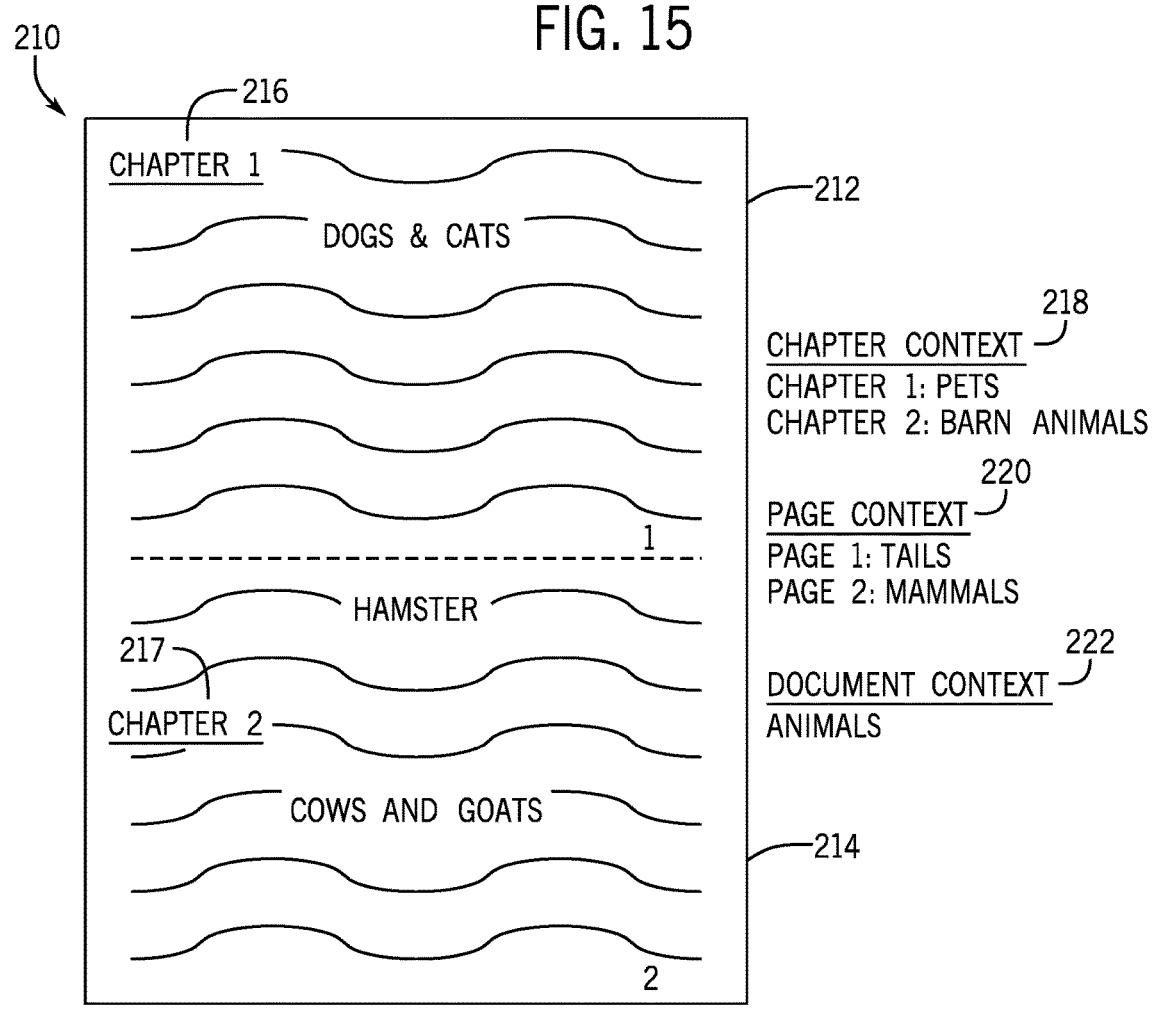
FIG. 16 is a schematic of a word document analysis based on the context of the document, in accordance with an embodiment.

To illustrate the impact of context to be analyzed when determining shape suggestions FIG. 16 depicts a word document 210 with multiple pages being analyzed based on varying context and/or weight of classifications based on context. For example, a first page 212 and a second page 214 each include one or more chapter summaries (e.g., text in one or more text objects 104). As depicted, a first chapter 216 may include a text portion relating to dogs and cats, and a text portion relating to hamsters. The text portion relating to dogs and cats may be included on the first page 212 while the text portion relating to hamsters may extend into the second page 214. Moreover, a second chapter 217 may include a text portion on the second page 214 that is related to cows and goats. Based on the context being analyzed (e.g., page, chapter, or both), one or more text objects 104 may be analyzed, and thus, the shape suggestion may vary based on the context.

For example, when a chapter context 218 is considered, such as for the first chapter 216, the aggregated classification for the context may result in suggested shapes relating to pets. The text classifier may determine that the text objects 104 of the first chapter 216 are related to dogs, cats, and hamsters. As such, these animals may be classified into the category of household pets. Thus, although a user may be actively editing the second page 214 that includes text objects 104 related to hamsters, cows and goats, the suggested shapes may be related to pets since the aggregated classification for the first chapter 216 context includes combined context of objects 104 on the first page 212 and a portion of the second page 214 and/or their associated weights (e.g., may include heavier weight for text objects 104 in the first chapter 216 when analyzing for a different context). However, if the context for analysis is changed to the chapter context 218 of the second chapter 217, then the aggregated classification may result in suggested shapes relating to barn animals. The text for of the second chapter 217 describes cows and goats, and as such, these animals may be categorized as barn animals.

In other embodiments, when the context is changed to a page context 220 and/or relatively heavier weight is given to a particular portion or page, such as for the first page 212, the aggregated classification may result in suggested shapes related to tails. In particular, the first page 212 includes text from a portion of the first chapter 216 that includes descriptions related to dogs and cats. Since both dogs and cats have tails, the aggregated classification may result in suggested shapes of tails. On the other hand, when the context is changed and/or relatively heavier weight is given to the page context 220 of the second page 214, the aggregated classification may result in suggested shapes related to mammals since the second page 214 includes text portions of the first chapter 216 related to hamsters and text portions of the second chapter 217 related to cows and goats.

Further, in some embodiments, when the context is changed to or a heavier weight is given to a document context 222, context of each object 104 and its metadata 106 may be combined to determine the aggregated classification. As such, classification from each page of the presentation, such as the first page 212 and the second page 214 may be combined to determine the aggregated classification. Since the entire presentation includes text objects 104 relating to dogs, cats, hamsters, cows, and goats, the aggregated classification may result in animals for the suggested shapes.

Figure 17:
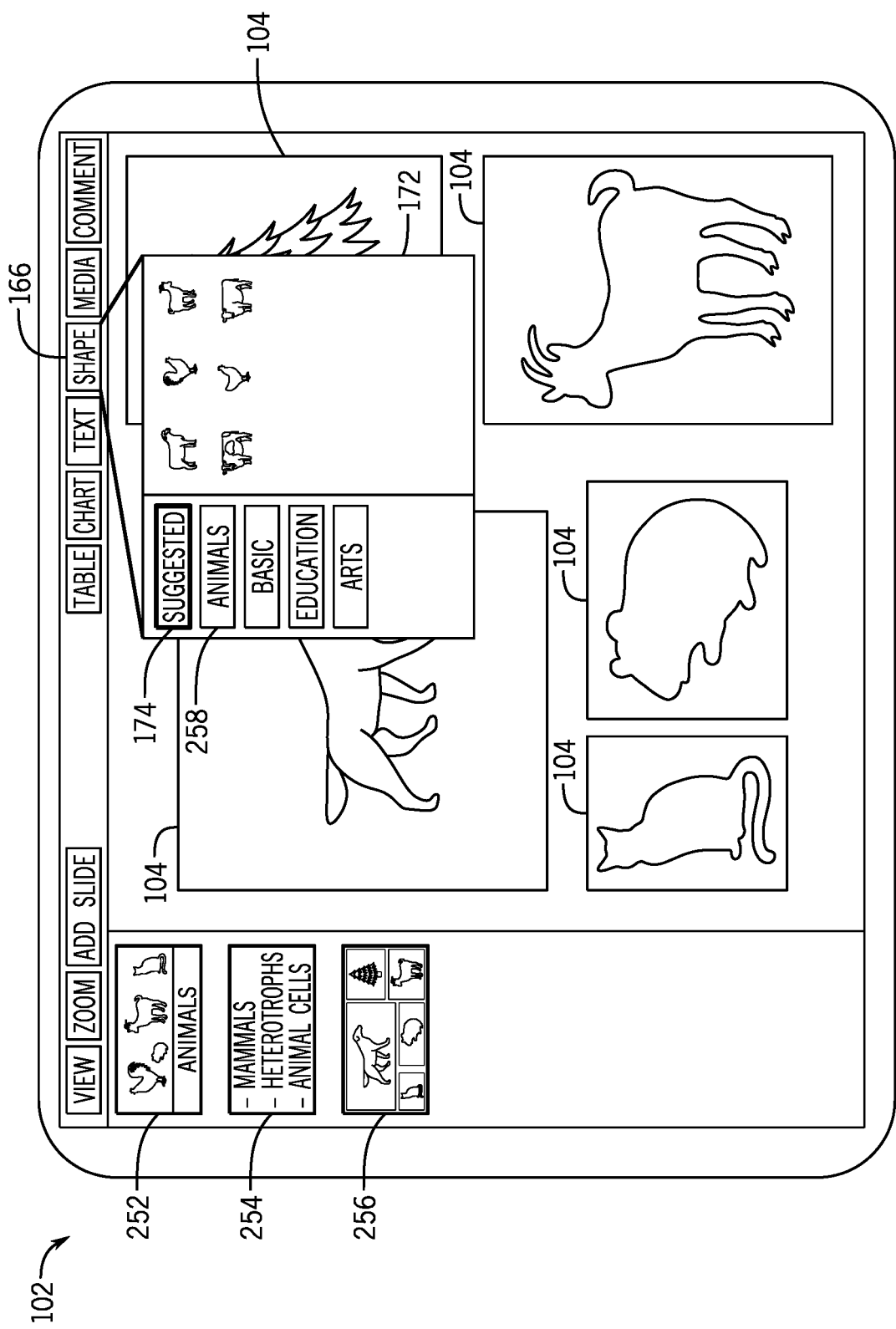
FIG. 17 is a schematic of a slide of the presentation application with a user inserting a suggested text shape based on aggregated and/or weight classification of objects, in accordance with an embodiment.

FIG. 17 illustrates suggested shapes based on aggregated classification and/or weight. In particular, the presentation application 102 includes multiple slides, such as a title slide 252, an intermediate slide 254, and a last slide 256. The title slide 252 includes a title text object 104 of "animal" along with image objects 104 of a rooster, mouse, goat, and a cat. However, the intermediate slide includes multiple text objects 104 relating to mammals, heterotrophs, and animal cells. Thus, the intermediate slide 254 may not be directly related to the animals of the title slide 252. Moreover, the last slide 256 includes image objects 104 of a dog, a pine tree, a cat, a mouse, and a goat.

In the depicted embodiment, the weight of the title slide 252 is given a higher weight context and thus, the "animal" title text object 104 and image objects 104 may be given relatively more weight than other objects 104 in the presentation. Accordingly, the aggregated classification using content data of text and image objects 104 within the title slide 252 along with their weights may provide suggested shapes of animals. In particular, animal shapes may be matched with a high confidence, as previously discussed. Upon the selection of the shape button 166, the user may view the shape library 172. In the shape library, the suggested shapes may include shape results of an aggregated and/or weighted classification indicating animal shapes. In some implementations, suggested shape may belong to particular categories. These categories may be prioritized within the library along with the suggested category 174. For example, the most relevant shapes provided in the suggested category 174 may include animal shapes from the animal category, and thus, the animal category may be listed after the suggested category 174. Additionally or alternatively, the categories that the suggested shapes belong to may be provided in the shape library 172 in place of or with the suggested shapes. Similarly, other shape categories may be matched and prioritized according to their confidence level (e.g., lower than the Animals category). Thus, the shape library 172 may prioritize existing shape categories that make up the suggested category 174 shapes. Accordingly, if the user selects the suggested category 174, the relevant shapes may include shapes from the categories in order of their prioritization.

Figure 18:
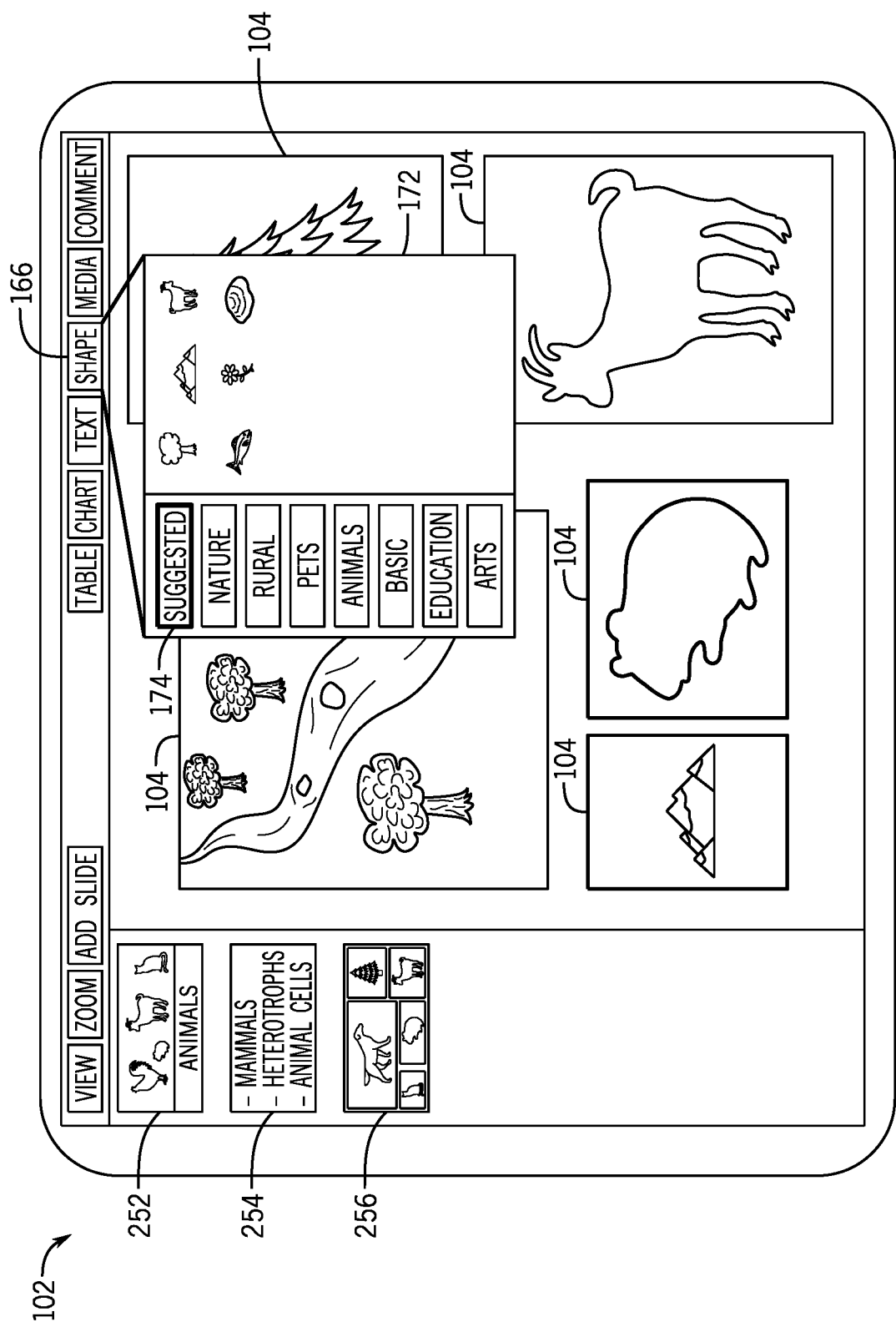
FIG. 18 is schematic of a slide of the presentation application with updated suggested shapes based on a change to context of FIG. 17, in accordance with an embodiment.

Similarly, FIG. 18 depicts the presentation application of FIG. 17 with the weight of contents on the last slide 256 as relatively higher than other objects 104 in the presentation. Thus, the shape library 172 may suggest different relevant shapes based on the updated weight classification for the last slide 256 and its objects 104. Here, the content of the last slide 256 includes image objects 104 of a creek, a pine tree, a cat, a mouse, and a goat. The weight given to the last slide 256 may be a higher weight (e.g., 5× more weight) than other slides or objects 104 on the other slides of the presentation. Accordingly, upon determining an aggregate classification and weight of the objects 104, the shape library 172 may suggest shapes more related to the contents of the last slide 256.

As shown, the suggested shapes in the shape category 174 may include a tree, a mountain, a goat, and other nature and animal related shapes. In particular, the aggregate classification and weights for objects 104, with a higher weight given to the contents of the last slide 256, results in nature shapes matched with the highest confidence. Moreover, the shape suggestions may belong to categories including nature, rural, pets, and animals. Accordingly, these categories may be prioritized by confidence and listed by most relevant (e.g., nature) to least relevant (e.g., animals) categories in the category portion of the shape library 172. Moreover, additional default categories (e.g., basic, education, arts) may be listed after the categories related to the suggested category. As previously mentioned, these categories that the suggested shapes belong to may be provided in the shape library 172 in place of or with the suggested shapes.

As such, the present techniques may automatically provide more accurate and relevant results for shape objects within the shape library and may improve accessibility and navigation for relevant shapes by prioritizing shape categories by their relevance.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. A tangible, non-transitory machine-readable medium, comprising machine-readable instructions that, when executed by one or more processors, cause a machine to, in a document of an application:
    detect an input indicating a modification of a first object in the document of the application, wherein the first object comprises a first picture;
    in response to detecting the input indicating the modification, provide a combination of both the first object and a second object comprising a second picture, information associated with the combination of both the first object and the second object, or both, to a classifier, the classifier comprising an image classifier that classifies the combination of both the first object and the second object, wherein the first object and the second object are associated with a context of the document;
    in response to providing the combination of both the first object and the second object, the information associated with the combination of both the first object and the second object, or both, to the classifier, receive, from the classifier, an aggregated classification comprising a topic associated with the first object and the second object;
    identify suggested content from a content library of the application for insertion into the document of the application based at least in part on the aggregated classification;
    receive, via a graphical user interface (GUI) of the application, a request to insert content from the content library of the application; and
    in response to receiving the request to insert content from the content library of the application, present, via the GUI of the application, the suggested content from the content library as one or more options that, when selected, are inserted in the document of the application.

2. The tangible, non-transitory machine-readable medium of claim 1, wherein the first object and the second object comprise metadata, wherein the metadata comprises: assigned classifications for the first object and the second object from the classifier, descriptive names of the first object and the second object, weights of contextual classification importance associated with the first object and the second object, or any combination thereof.

3. The tangible, non-transitory machine-readable medium of claim 2, wherein the modification comprises an addition, a removal, or a change in content of the first object, the metadata, or a combination thereof.

4. The tangible, non-transitory machine-readable medium of claim 1, wherein the image classifier comprises a database of folders each labeled with a unique content classification tag associated with an image content inside a folder of the database of folders.

5. The tangible, non-transitory machine-readable medium of claim 4, wherein the aggregated classification is based on image contents of the first object matching the image content inside one or more folders of the database of folders, wherein the matching comprises a threshold confidence level, and wherein the image classifier provides the aggregated classification of the first object and the second object in response to the matching being equal to or greater than the threshold confidence level.

6. The tangible, non-transitory machine-readable medium of claim 1, wherein the suggested content comprises a shape from a shape library, a video from a video library, audio from an audio library, an image from an image library, or a combination thereof.

7. The tangible, non-transitory machine-readable medium of claim 1, wherein the first object comprises a picture derived from one or more frames of a video of the document, and wherein the tangible, non-transitory machine-readable medium comprises machine-readable instructions that, when executed by the one or more processors, cause the machine to:
    in response to the first object comprising the video, perform, via the image classifier, classification of one or more frames of the video.

8. The tangible, non-transitory machine-readable medium of claim 1, comprising machine-readable instructions that, when executed by the one or more processors, cause the machine to:
    determine the context of the document for identifying the suggested content;
    identify the aggregated classification for a set of objects within the context; and
    determine the suggested content based on the aggregated classification.

9. The tangible, non-transitory machine-readable medium of claim 8, wherein the context is selectively configurable as one of: a portion of the document, whole document, or one or more particular objects in the document.

10. The tangible, non-transitory machine-readable medium of claim 9, wherein the aggregated classification when the context is selectively configured as the portion of the document is different than the aggregated classification when the context is selectively configured as the whole document or the one or more particular objects in the document.

11. The tangible, non-transitory machine-readable medium of claim 9, wherein the document comprises a spreadsheet application document and the portion comprises a sheet, a row, a column, or any combination thereof of the spreadsheet application document.

12. The tangible, non-transitory machine-readable medium of claim 9, wherein the document comprises a presentation application document and the portion of the document comprises a slide of the presentation application document.

13. The tangible, non-transitory machine-readable medium of claim 9, wherein the document comprises a word processing application document and the portion comprises a chapter, a page, or both of the word processing application document.

14. The tangible, non-transitory machine-readable medium of claim 8, comprising machine-readable instructions that, when executed by the one or more processors, cause the machine to:
 identify the aggregated classification for the set of objects within the context by weighing a classification importance of each of the set of objects within the context, the weighing based upon a location, size, type, or other characteristic associated with each of the set of objects within the context.

15. The tangible, non-transitory machine-readable medium of claim 1, comprising machine-readable instructions that, when executed by the one or more processors, cause the machine to:
 receive, via the GUI of the application, a selection of one of the one or more options; and
 insert a piece of suggested content associated with the one of the one or more options into the document.

16. The tangible, non-transitory machine-readable medium of claim 15, comprising machine-readable instructions that, when executed by the one or more processors, cause the machine to:
 receive a request to edit the piece of suggested content; and
 in response to receiving the request to edit the piece of suggested content, modify the piece of suggested content.

17. The tangible, non-transitory machine-readable medium of claim 1, wherein the document comprises a word processing document, a spreadsheet document, a slide presentation document, or any combination thereof.

18. An electronic device, comprising:
 an electronic display;
 one or more input structures;
 a processor configured to execute instructions to:
  render, on the electronic display, a graphical user interface (GUI) of a document loaded in a document application;
  detect, via the one or more input structures, a request to change a first object, metadata, or both, in the document, the request indicating a modification of the first object in the document loaded in the document application, wherein the first object comprises a picture and is associated with a context of the document loaded in the document application;
  in response to detecting the request indicating the modification, provide a combination of both the first object and a second object comprising a text object in the document loaded in the document application and that is associated with the context of the document loaded in the document application, information associated with the combination of both the first object and the second object, or both, to a classifier, the classifier comprising an image classifier, a text classifier, or a combination thereof, that classifies the combination of both the first object and the second object, the information associated with the combination of both the first object and the second object, or both;
  in response to providing the combination of both the first object and the second object, the information associated with the combination of both the first object and the second object, or both, to the classifier, receive, from the classifier, an aggregated classification comprising a topic associated with the first object and the second object;
  identify suggested content from a content library of the application for insertion into the document loaded in the document application based at least in part on the aggregated classification;
  receive, via a graphical user interface (GUI) of the document application, a request to insert content from the content library of the application; and
  in response to receiving the request to insert content from the content library of the application, present, via the GUI of the application, the suggested content from the content library as one or more options that, when selected, are inserted in the document loaded in the document application.

19. The electronic device of claim 18, wherein the received aggregated classification comprises an accuracy level that is greater than a predetermined accuracy confidence threshold.

20. The electronic device of claim 18, wherein the first object and the second object comprise a text object, an image object, a video object, a shape object, a title object, or any combination thereof.

21. The electronic device of claim 18, wherein presenting the suggested content is provided in a content category of a shape library in the document loaded in the document application, wherein the shape library comprises one or more categories comprising the suggested content.

22. The electronic device of claim 21, wherein the one or more categories are prioritized based on a matching of a confidence level threshold used for the aggregated classification of the changed first object.

23. The electronic device of claim 21, wherein the content category comprises the one or more categories, the suggested content, or a combination thereof.

24. A method, comprising:
 detecting an input indicating a modification of a first object in a document of an application, wherein the first object comprises a first picture;
 in response to detecting the input indicating the modification, providing a combination of both the first object and a second object comprising a second picture, information associated with the combination of both the first object and the second object, or both, to a classifier, the classifier comprising an image classifier that classifies the combination of both the first object and the second object, wherein the first object and the second object are associated with a context of the document;
 in response to providing the combination of both the first object and the second object, the information associated with the combination of both the first object and the second object, or both, to the classifier, receiving, from the classifier, an aggregated classification comprising a topic associated with the first object and the second object;

determining context of the document for suggested content;

aggregating classification for the first object and the second object based on the context;

identifying the suggested content from a content library of the application for insertion into the document of the application based at least in part on the aggregated classification, the suggested content, or a combination thereof;

receiving a request to insert content from the content library of the application; and in response to receiving the request to insert content from the content library of the application, presenting the suggested content from the content library as one or more options that, when selected, are inserted in the document of the application.

\* \* \* \* \*